(12) United States Patent
McFarland et al.

(10) Patent No.: US 8,675,651 B2
(45) Date of Patent: Mar. 18, 2014

(54) COEXISTENCE MECHANISM FOR NON-COMPATIBLE POWERLINE COMMUNICATION DEVICES

(75) Inventors: William J. McFarland, Los Altos, CA (US); Srinivas Katar, Gainesville, FL (US); Lawrence W. Yonge, III, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 13/008,570

(22) Filed: Jan. 18, 2011

(65) Prior Publication Data

US 2012/0093151 A1    Apr. 19, 2012

Related U.S. Application Data

(60) Provisional application No. 61/295,867, filed on Jan. 18, 2010.

(51) Int. Cl.
*H04L 12/28* (2006.01)
*H04L 12/413* (2006.01)
*H04J 3/02* (2006.01)
*G05B 23/02* (2006.01)
*G05B 11/01* (2006.01)
*G08C 19/16* (2006.01)

(52) U.S. Cl.
USPC ............ 370/389; 370/447; 370/462; 340/3.1; 340/12.32

(58) Field of Classification Search
USPC ................ 370/389, 447, 462; 340/3.1, 12.32
See application file for complete search history.

(56) References Cited

U.S. PATENT DOCUMENTS

| 5,574,748 | A  | * | 11/1996 | Vander Mey et al. | 375/139 |
| 6,807,189 | B1 | * | 10/2004 | Fischer | 370/447 |
| 2005/0185629 | A1 | * | 8/2005 | Kuroda et al. | 370/347 |

(Continued)

FOREIGN PATENT DOCUMENTS

| WO | WO2007090891 A1 | 8/2007 |
| WO | WO2010027800 A2 | 3/2010 |
| WO | WO2012099943 A1 | 1/2012 |
| WO | WO2012099951 A1 | 7/2012 |

OTHER PUBLICATIONS

International Search Report and Written Opinion—PCT/US2012/021694—ISAEPO—Apr. 16, 2012.

(Continued)

*Primary Examiner* — Alpus H Hsu
*Assistant Examiner* — Yee Lam
(74) *Attorney, Agent, or Firm* — DeLizio Gilliam, PLLC

(57) ABSTRACT

A powerline network may comprise powerline communication (PLC) devices of a first class of PLC devices that are incompatible with PLC devices of a second class of PLC devices. This can result in interference between communications of the first and the second classes of PLC devices. A dual mode PLC device that is compatible with the first and the second classes of PLC devices can be implemented for coexistence with both classes of PLC devices. The dual mode PLC device can determine whether the powerline network comprises a combination of PLC devices of the first and the second classes of PLC devices. One of a plurality of packet headers that is compatible with both the classes of PLC devices can be selected for transmission in response to determining that the powerline network comprises a combination of PLC devices of the first and the second classes of PLC devices.

25 Claims, 10 Drawing Sheets

(56) References Cited

U.S. PATENT DOCUMENTS

| | | | |
|---|---|---|---|
| 2006/0268705 A1* | 11/2006 | Kurobe et al. | 370/230 |
| 2007/0097960 A1* | 5/2007 | Kurobe et al. | 370/352 |
| 2007/0230377 A1* | 10/2007 | Nosaka et al. | 370/294 |
| 2008/0055067 A1* | 3/2008 | Curt et al. | 340/538.12 |
| 2008/0279126 A1* | 11/2008 | Katar et al. | 370/294 |
| 2009/0072985 A1 | 3/2009 | Patel et al. | |
| 2009/0074007 A1* | 3/2009 | Yonge et al. | 370/468 |
| 2009/0252144 A1* | 10/2009 | Ji | 370/345 |
| 2010/0007473 A1* | 1/2010 | Fadell | 340/310.11 |
| 2010/0272192 A1* | 10/2010 | Varadarajan et al. | 375/257 |
| 2012/0051361 A1* | 3/2012 | O'Mahony | 370/392 |
| 2012/0093198 A1 | 4/2012 | Dabak et al. | |
| 2012/0093240 A1 | 4/2012 | McFarland et al. | |
| 2012/0106606 A1* | 5/2012 | Samy | 375/222 |
| 2012/0170625 A1* | 7/2012 | Kim et al. | 375/219 |
| 2012/0246331 A1* | 9/2012 | Heller et al. | 709/230 |

OTHER PUBLICATIONS

International Search Report and Written Opinion—PCT/US2012/021707—ISA/EPO—Jun. 8, 2012.

Co pending U.S. Appl. No. 13/008,554, filed Jan. 18, 2011, 42 pages.

"PCT Application No. PCT/US12/21707 International Preliminary Report on Patentability", Mar. 14, 2013, 8 pages.

"PCT Application No. PCT/US2012/021694 International Preliminary Report on Patentability", Jan. 14, 2013, 7 pages.

* cited by examiner

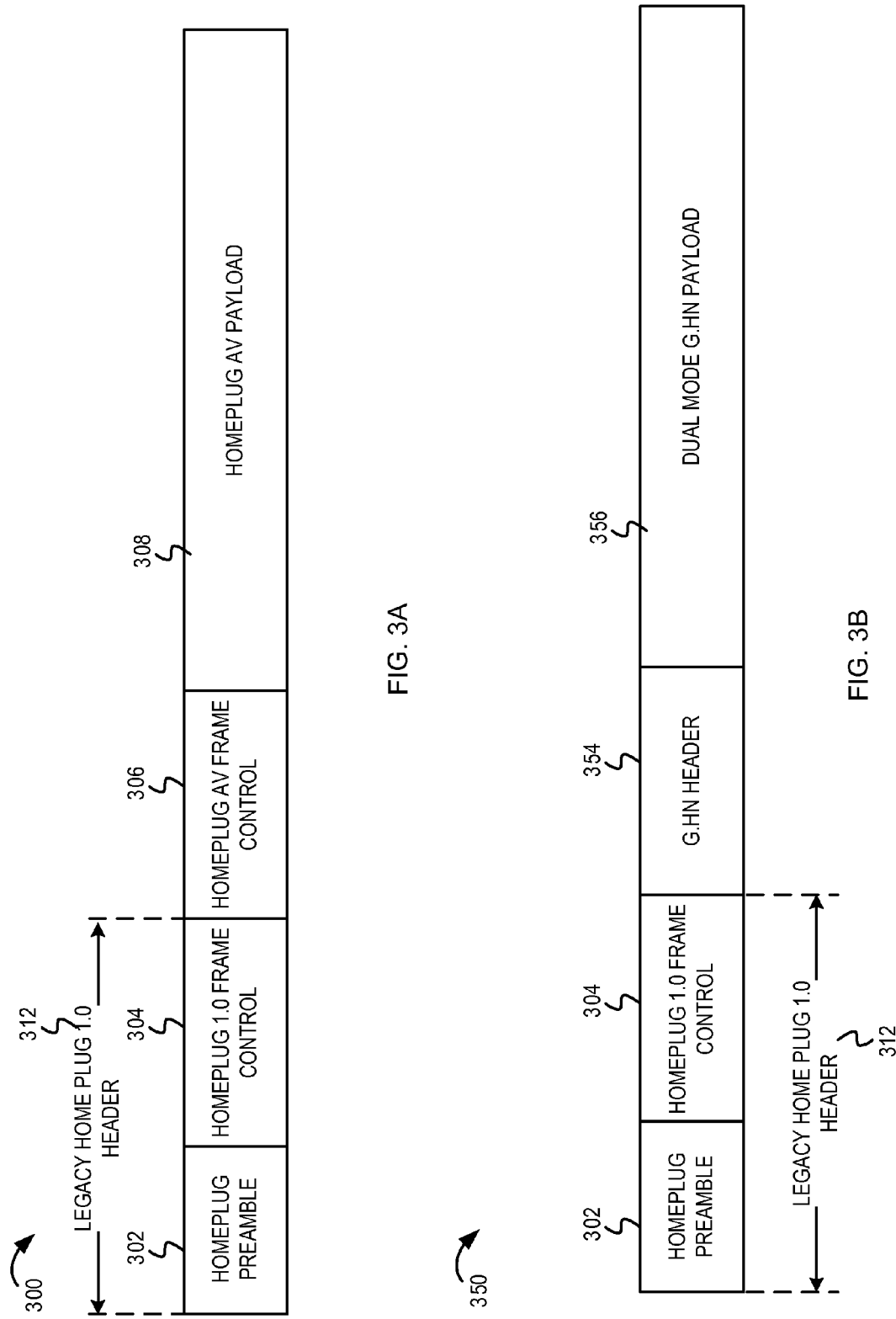

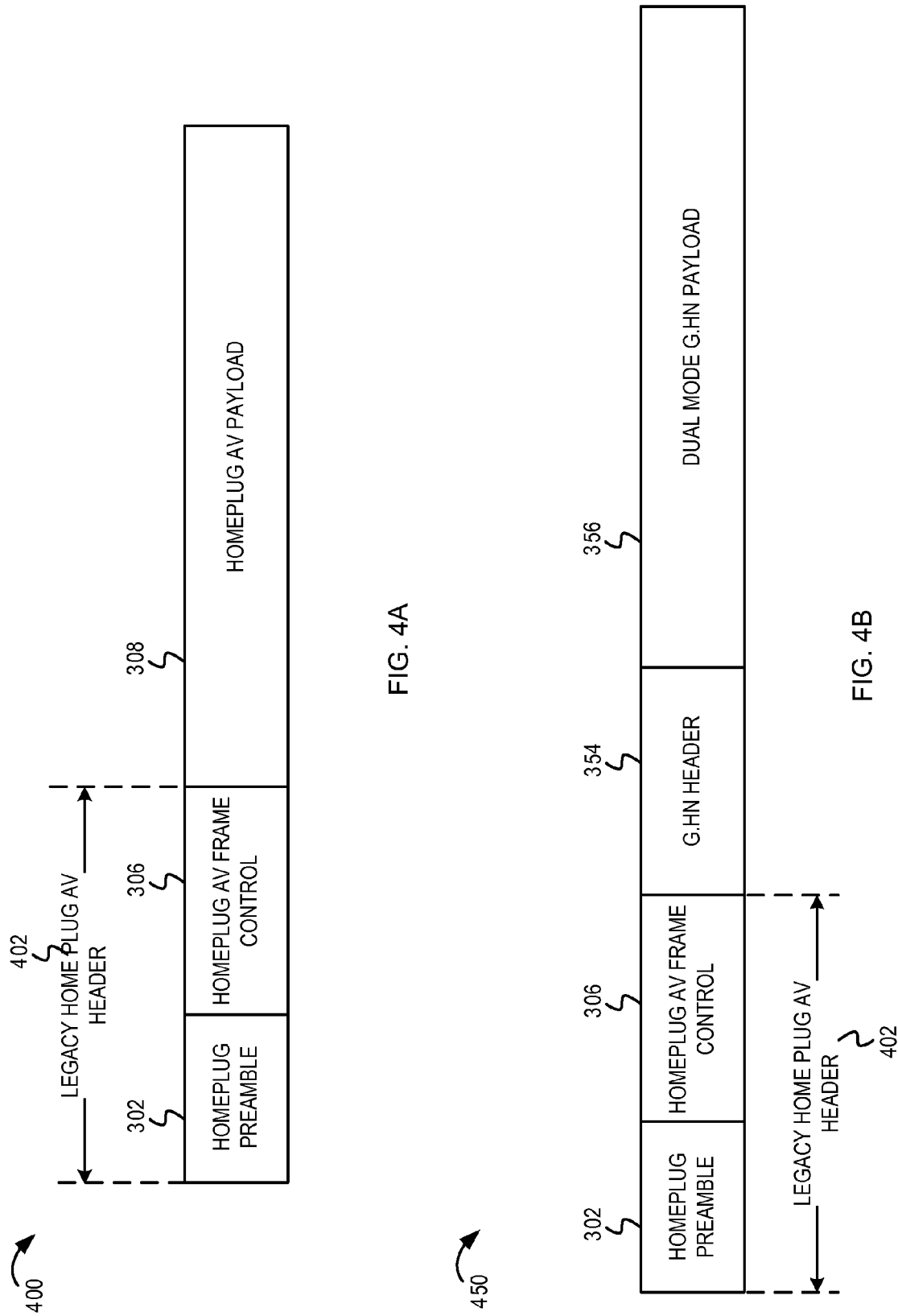

US 8,675,651 B2

COEXISTENCE MECHANISM FOR NON-COMPATIBLE POWERLINE COMMUNICATION DEVICES

RELATED APPLICATION

This application claims the priority benefit of U.S. Provisional Application Ser. No. 61/295,867 filed Jan. 18, 2010.

BACKGROUND

Embodiments of the inventive subject matter generally relate to the field of communication networks and, more particularly, to coexistence mechanism for non-compatible powerline communication devices.

Electric transmission and distribution lines are typically used for providing electric power from generators to buildings, residences, and other components of a city's infrastructure. Electric power is transmitted over the transmission lines at a high voltage, and distributed to buildings and other structures at much lower voltages using electric power lines. Besides providing electric power, electric power lines can also be used to implement powerline communications within buildings and other structures. Powerline communications provides a means for networking electronic devices together and also connecting the electronic devices to the Internet. When powerline communication devices that implement different communication standards are connected to the powerline network, communication from one class of powerline communication devices may interfere with communication from another class of powerline communication devices.

SUMMARY

Various embodiments of a coexistence mechanism for non-compatible powerline communication devices are disclosed. In one embodiment, a dual mode powerline communication device determines whether a powerline communication network comprises a combination of one or more powerline communication devices of a first class of powerline communication devices and one or more powerline communication devices of a second class of powerline communication devices. One of a plurality of packet headers that is compatible with the first class of powerline communication devices and the second class of powerline communication devices is selected in response to determining that the powerline communication network comprises a combination of the one or more powerline communication devices of the first class of powerline communication devices and the one or more powerline communication devices of the second class of powerline communication devices. A packet is generated for transmission based, at least in part, on the selected one of the plurality of packet headers that is compatible with the first class of powerline communication devices and the second class of powerline communication devices. The packet is transmitted via the powerline communication network.

BRIEF DESCRIPTION OF THE DRAWINGS

The present embodiments may be better understood, and numerous objects, features, and advantages made apparent to those skilled in the art by referencing the accompanying drawings.

FIG. 3A is an example format of one embodiment of a HomePlug AV packet;

FIG. 3B is an example format of one embodiment of a dual mode G.HN packet;

FIG. 4A is an example format of a second embodiment of HomePlug AV packet;

FIG. 4B is an example format of a second embodiment of a dual mode G.HN packet;

DESCRIPTION OF EMBODIMENT(S)

Figure 1:
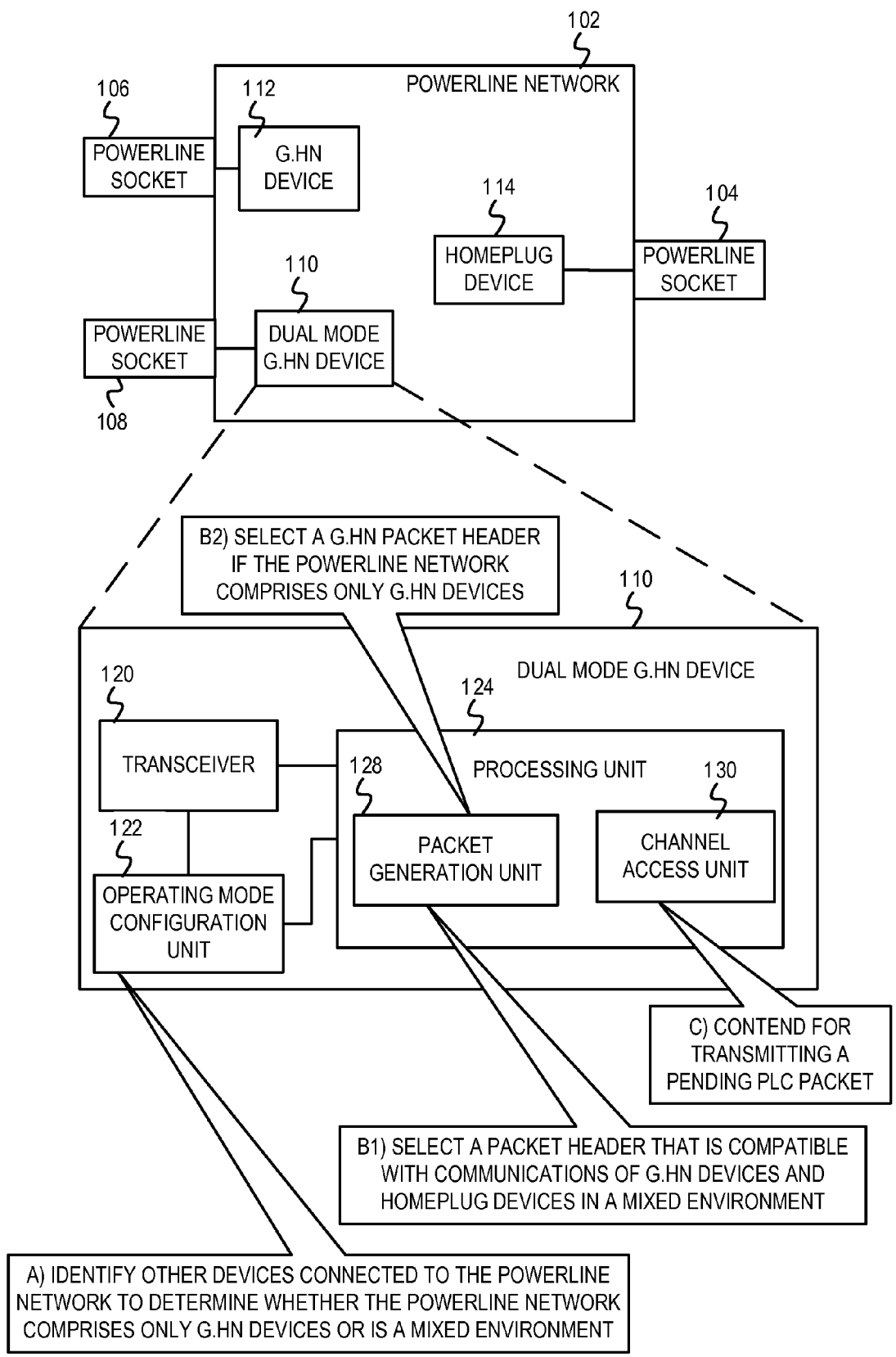
FIG. 1 is an example block diagram illustrating a powerline network including a mechanism for maintaining coexistence between powerline communication (PLC) devices.

The description that follows includes exemplary systems, methods, techniques, instruction sequences, and computer program products that embody techniques of the present inventive subject matter. However, it is understood that the described embodiments may be practiced without these specific details. For instance, although examples refer to a coexistence mechanism between G.HN and HomePlug powerline communication devices, embodiments are not so limited. In other implementations, the coexistence mechanism described herein can also be implemented for other suitable non-compatible powerline communication devices (e.g., HomePlug powerline communication devices and Opera® powerline communication devices). In other instances, well-known instruction instances, protocols, structures, and techniques have not been shown in detail in order not to obfuscate the description.

Broadband over powerline communication focuses on enabling broadband communication via existing powerline networks (e.g., power lines in homes and buildings). Powerline communication (PLC) devices connected to the powerline network can employ suitable powerline communication standards to communicate with other PLC devices connected to the powerline network. Interference between different classes of PLC devices connected to the powerline network (e.g., a HomePlug device and a G.HN device) may be introduced when the PLC devices simultaneously attempt to communicate via the powerline network. Typically, the HomePlug devices connected to the powerline network exchange information with other HomePlug devices using standards defined by a HomePlug powerline alliance. Likewise, the G.HN devices connected to the powerline network and exchange information with other G.HN devices using defined G.HN standards. However, the G.HN devices are unable to communicate with, cannot detect, and are not backwards compatible with the HomePlug devices. Therefore, the HomePlug devices may attempt to initiate communications during communications of the G.HN devices. Likewise, the G.HN devices may attempt to initiate communications during the communications of the HomePlug devices. This can result in interference between the HomePlug devices and the G.HN devices, corrupt communications and impact performance of the PLC devices in the powerline network.

Dual mode G.HN devices can be implemented to enable detection of and backwards compatibility with HomePlug devices. The dual mode G.HN devices can be configured to determine whether the powerline network comprises a mixed environment with two or more incompatible classes of PLC devices (e.g., HomePlug devices and G.HN devices). On determining that the powerline network comprises a mixed environment, the dual mode G.HN device can select one of multiple headers that can be recognized by both the incompatible classes of PLC devices ("compatibility packet headers") for dual mode G.HN transmissions. The compatibility packet headers can comprise both an indication of a transmission duration associated with the dual mode G.HN transmission in a format that can be detected by the HomePlug devices and another indication of the transmission duration in a format that can be detected by the G.HN devices. This can ensure that both the HomePlug devices and the G.HN devices can defer their respective transmissions for the transmission duration associated with the dual mode G.HN transmission, thus minimizing interference. Such an implementation of the dual mode G.HN devices can enable coexistence and compatibility between the HomePlug devices and the G.HN devices.

FIG. 1 is an example block diagram illustrating a powerline network 102 including a mechanism for maintaining coexistence between powerline communication (PLC) devices in the powerline network 102. The powerline network 102 comprises powerline sockets 104, 106, and 108 that enable powerline devices to connect to the powerline network 102. One or more PLC devices may connect to the powerline network 102 via the powerline sockets. For example, as depicted in FIG. 1, a HomePlug device 114 connects to the powerline network 102 via the powerline socket 104, a G.HN device 112 connects to the powerline network 102 via the powerline socket 106, and a dual mode G.HN device 110 connects to the powerline network 102 via the powerline socket 108. The HomePlug device 114 can implement HomePlug 1.0 powerline communication standards, HomePlug AV powerline communication standards, or other suitable versions of the HomePlug powerline communication standards. The HomePlug device 114 can exchange information (over a powerline medium that comprises the powerline network 102) with other HomePlug devices using any suitable communication standards defined by a HomePlug powerline alliance. The G.HN device 114 can exchange information over the powerline medium with other G.HN devices in accordance with G.HN communication standards. As depicted in FIG. 1, the dual mode G.HN device 110 comprises a transceiver 120, an operating mode configuration unit 122, and a processing unit 124. The processing unit 124 comprises a packet generation unit 128 and a channel access unit 130. The packet generation unit 128 can comprise functionality to select an appropriate header based on classes (or type) of PLC devices (i.e., whether G.HN devices and/or HomePlug devices) that are connected to the powerline network 102. The processing unit 124 can further encapsulate data to be transmitted in the selected header and can extract/process data from a received packet. As will be described below with reference to stages A, B1, B2, and C, the dual mode G.HN device 110 can be configured to enable detection of and backwards compatibility with the HomePlug device 114. In other words, the dual mode G.HN device 110 is a G.HN device that can implement a compatibility mechanism to communicate with both the G.HN device 112 and the non-compatible HomePlug device 114.

At stage A, the operating mode configuration unit 122 identifies other PLC devices connected to the powerline network 102 and determines whether the powerline network 102 comprises a mixed environment. In other words, the operating mode configuration unit 122 can determine whether the powerline network 102 is a mixed environment comprising both G.HN devices and HomePlug devices, or whether the powerline network 102 comprises only G.HN devices (e.g., the G.HN device 112). In one example, as will be described with reference to FIGS. 2, 3A, and 4A, the operating mode configuration unit 122 can determine whether the powerline network 102 comprises a mixed environment based on reading headers associated with one or more received PLC packets. For example, if the operating mode configuration unit 122 determines that a HomePlug packet was received, the operating mode configuration unit 122 may conclude that the powerline network 102 comprises a mixed environment. As another example, if the operating mode configuration unit 122 does not receive a HomePlug packet (e.g., over a predetermined time interval), the operating mode configuration unit 122 may conclude that the powerline network 102 comprises only G.HN devices (and/or dual mode G.HN devices).

In a mixed environment, the dual mode G.HN device 110 may operate as a dual mode compatibility device, transmitting data with an appropriate header ("compatibility packet header") that can be recognized by both the G.HN device 112 and the HomePlug device 114, as will be described with reference to stage B1. When the powerline network 102 comprises only G.HN devices in addition to one or more dual mode G.HN devices 110, the dual mode G.HN device 110 may operate as a G.HN device, transmitting data using headers in accordance with the G.HN communication standards ("G.HN packet headers"), as will be described with reference to stage B2. Furthermore, in some implementations, if the powerline network 102 comprises only HomePlug devices (in addition to other dual mode G.HN devices), the dual mode G.HN device 110 can either operate as a dual mode compatibility device and transmit data using the compatibility packet headers or can operate as a HomePlug device and transmit data using headers in accordance with the HomePlug communication standards ("HomePlug packet headers").

At stage B1, in response to determining that the powerline network 102 is a mixed environment, the packet generation unit 128 selects a packet header that is compatible with communication protocols of both the G.HN devices and the HomePlug devices (i.e., a compatibility packet header). For example, the packet generation unit 128 can receive an indication (from the operating mode configuration unit 122) that the powerline network 102 comprises a both G.HN devices and HomePlug devices connected to the powerline network 102. Consequently, the packet generation unit 128 can select an appropriate compatibility packet header that enables both the HomePlug devices and the G.HN devices to receive the compatibility packet header, determine a duration for which the powerline medium will be in use (e.g., by the dual mode G.HN device 110), and consequently defer from initiating transmissions for the duration for which the powerline medium will be in use. For example, the packet generation unit 128 may select the header format described below with reference to FIG. 3B on determining that the powerline network 102 comprises G.HN devices and HomePlug 1.0 devices and/or HomePlug AV devices. As another example, the packet generation unit 128 may select the header format described below with reference to FIG. 4B on determining that the powerline network 102 comprises HomePlug AV devices and G.HN devices. The packet generation unit 128 can then encapsulate data to be transmitted in the selected compatibility packet header to generate a pending PLC packet. The packet generation unit 128 can also cause the channel access unit 130 to contend for the powerline medium, as will be described below in stage C.

At stage B2, in response to determining that the powerline network 102 includes only G.HN compatible devices, the packet generation unit 128 selects a G.HN packet header. For example, the packet generation unit 128 may receive an indication (from the operating mode configuration unit 122) that the powerline network 102 only comprises G.HN devices (i.e., does not comprise any HomePlug devices). Consequently, the packet generation unit 128 can select the G.HN packet header that enables only the G.HN devices (and the dual mode G.HN devices) to receive the G.HN packet header, determine a duration for which the powerline medium will be in use (e.g., by the dual mode G.HN device 110), and consequently defer from initiating transmissions for the duration for which the powerline medium will be in use. The packet generation unit 128 can then encapsulate data to be transmitted in the G.HN packet header to generate a pending PLC packet. The packet generation unit 128 can also cause the channel access unit 130 to contend for the powerline medium, as will be described in stage C.

At stage C, the channel access unit 130 contends for transmitting the pending PLC packet via the powerline medium. In some implementations, the channel access unit 130 can contend for control of the powerline medium based on the priority of the pending PLC packet. As will be further described with reference to FIG. 7, in one implementation, the channel access unit 130 can indicate the priority of the pending PLC packet during priority resolution time slots and can determine whether other PLC devices connected to the powerline network 102 have pending PLC packets with a higher priority. If the channel access unit 130 determines that the priority of the pending PLC packet at the dual mode G.HN device 110 has the highest priority, the channel access unit 130 can execute channel contention procedures (e.g., carrier sense multiple access (CSMA) procedures) to further contend for control of the powerline medium. If the channel access unit 130 gains control of the powerline medium, the channel access unit 130 can cause the transceiver 120 to transmit the pending PLC packet via the powerline medium. It is noted that in other implementations, in addition to priority associated with the pending PLC packet, contention for control of the powerline medium may also be based on the application that generated the data associated with the pending PLC packet, the length of the pending PLC packet, and/or other factors associated with the pending PLC packet.

Figure 2:
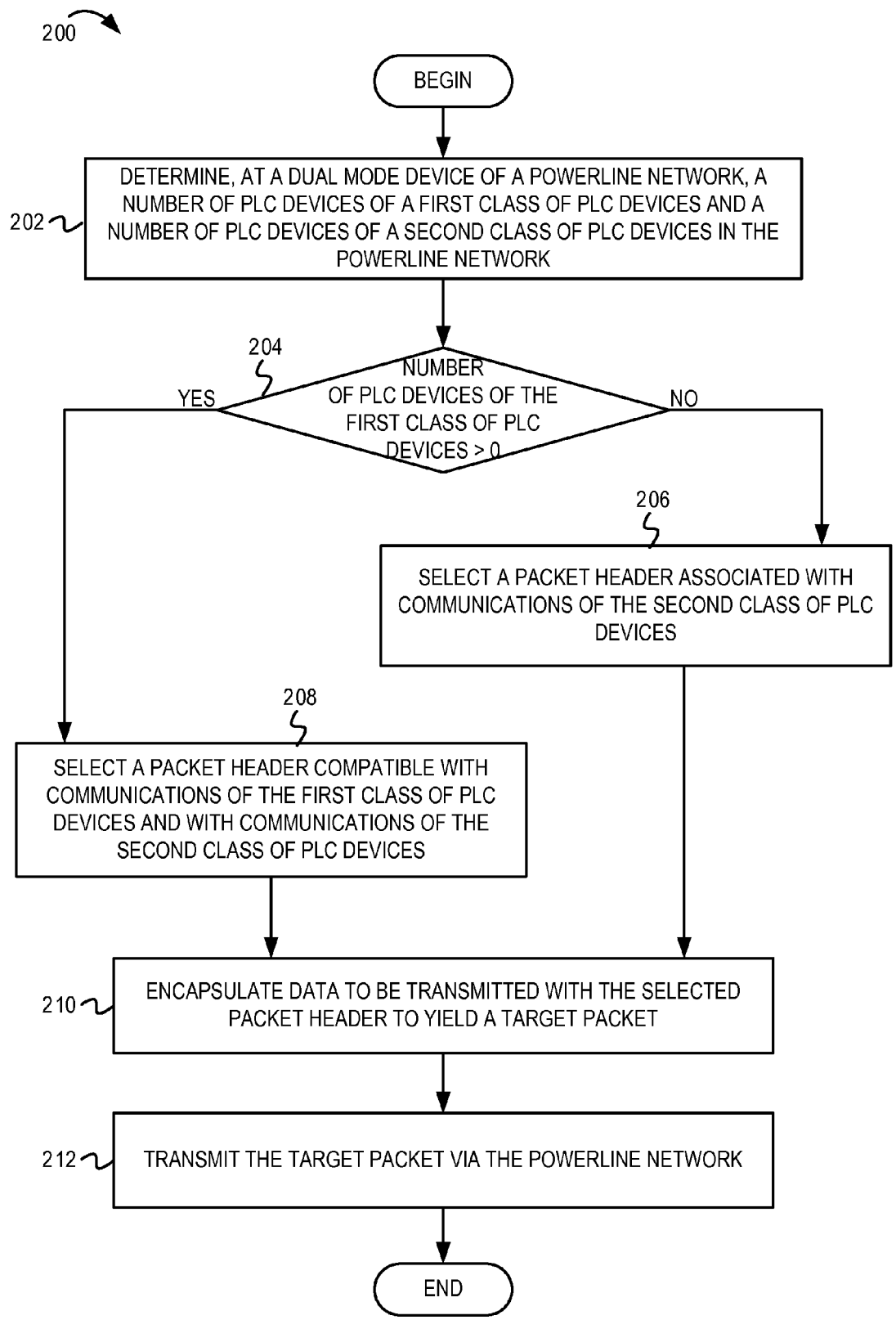
FIG. 2 is a flow diagram illustrating example operations for selecting an appropriate packet header for communication via a powerline network.

FIG. 2 is a flow diagram ("flow") 200 illustrating example operations for selecting an appropriate packet header for communication via a powerline network. The flow 200 begins at block 202.

At block 202, a number of PLC devices of a first class of PLC devices and a number of PLC devices of a second class of PLC devices are determined at a dual mode device of a powerline network. For example, with reference to FIG. 1, the operating mode configuration unit 122 of the dual mode G.HN device 110 can determine a number of HomePlug devices (i.e., the PLC devices of the first class of PLC devices) and a number of G.HN devices (i.e., the PLC devices of the second class of PLC devices) connected to the powerline network 102. In some implementations, the dual mode G.HN device 110 may not determine an exact number of HomePlug devices or G.HN devices in the powerline network 102. Instead, the operating mode configuration unit 122 can identify the presence of various PLC devices in the powerline network 102, based on the format of packets received at the dual mode G.HN device 110. For example, receiving a packet with the packet format 300 of FIG. 3A (which will be described below) and a packet with a G.HN packet format can indicate that the powerline network 102 comprises a combination of HomePlug 1.0 devices, HomePlug AV devices, and G.HN devices. As another example, receiving a packet with the packet format 400 of FIG. 4A (which will be described below) and a packet with the G.HN packet format can indicate that the powerline network 102 comprises HomePlug AV devices and G.HN devices (and does not comprise HomePlug 1.0 devices). The flow continues at block 204.

At block 204, it is determined whether the number of PLC devices of the first class of PLC devices is greater than zero. For example, the operating mode configuration unit 122 can determine whether the number of HomePlug devices (i.e., the PLC devices of the first class of PLC devices) is greater than zero. In other words, the operating mode configuration unit 122 can determine whether the powerline network 102 is a mixed environment (i.e., comprises a combination of G.HN devices and HomePlug devices) or whether the powerline network 102 comprises only G.HN devices. If it is determined that the number of PLC devices of the first class of PLC devices is greater than zero, the operating mode configuration unit 122 determines that the powerline network 102 comprises a mixed environment and the flow continues at block 208. Otherwise, the operating mode configuration unit 122 determines that the powerline network 102 comprises only G.HN devices and the flow continues at block 206.

At block 206, a packet header associated with communications of the second class of PLC devices is selected. For example, the packet generation unit 128 may receive an indication (e.g., from the operating mode configuration unit 122) that the powerline network 102 does not comprise any HomePlug devices and that the powerline network 102 comprises only G.HN devices and/or dual mode G.HN devices. As described above, the dual mode G.HN devices are PLC devices that implement G.HN communication standards. The dual mode G.HN devices are configured to communicate with both other G.HN devices (that are incompatible with HomePlug devices) and the HomePlug devices for compatibility between the two classes of incompatible PLC devices. Consequently, the packet generation unit 128 can select a G.HN packet header and can generate subsequent dual mode G.HN packets using the selected G.HN packet header. The flow continues at block 210.

At block 208, a packet header compatible with communications of the first class of PLC devices and with communications of the second class of PLC devices is selected. For example, the packet generation unit may receive an indication (e.g., from the operating mode configuration unit 122) that the powerline network 102 comprises both HomePlug devices and G.HN devices. Consequently, the packet generation unit 128 can select an appropriate compatibility packet header that can be detected by both the HomePlug devices and the G.HN devices. The packet generation unit 128 can also determine that subsequent dual mode G.HN packets should be generated using the selected compatibility packet header. For example, if it is determined that the powerline network 102 comprises a combination of HomePlug 1.0 devices, HomePlug AV devices, and G.HN devices, the packet generation unit 128 can determine to use the packet format 350 of FIG. 3B, the packet format 500 of FIG. 5A, or the packet format 550 of FIG. 5B, as will be further described below. As another example, if it is determined that the powerline network comprises a combination of HomePlug AV devices and G.HN devices, the packet generation unit 128 can determine to use the packet format 450 of FIG. 4B or the packet format 550 of FIG. 5B. The flow continues at block 210.

At block 210, the data to be transmitted is encapsulated with the selected packet header to yield a target packet. The flow 200 moves from block 206 to block 210 after the G.HN packet header is selected on determining that the powerline network 102 does not comprise any HomePlug devices. After block 206, the packet generation unit 128 can encapsulate the data to be transmitted with the G.HN packet header to yield the target dual mode G.HN packet. The flow 200 moves from block 208 to block 210 after the appropriate compatibility packet header is selected on determining that the powerline network 102 comprises both HomePlug devices and G.HN devices. After block 208, the packet generation unit 128 can encapsulate the data to be transmitted with the compatibility packet header to yield the target dual mode G.HN packet that is compatible with both HomePlug devices and G.HN devices. The flow continues at block 212.

At block 212, the target packet is transmitted via the powerline network 102. For example, the transceiver 120 can transmit the target dual mode G.HN packet via the powerline network 102 to a destination PLC device. From block 212, the flow ends.

As described above, the dual mode G.HN device 110 can identify the PLC devices in the powerline network 102 based on packets received at (or detected by) the dual mode G.HN device 110. Consequently, the dual mode G.HN device 110 can select the appropriate packet header for subsequent transmissions of the dual mode G.HN device. As will be described below, FIGS. 3A and 4A illustrate example formats of a HomePlug packet, while FIGS. 3B, 4B, 5A, and 5B illustrate example formats of a dual mode G.HN packet.

FIG. 3A is an example format of one embodiment of a HomePlug AV packet 300. HomePlug AV devices typically support a hybrid mode packet format (as depicted in FIG. 3A) to maintain compatibility between various versions of the HomePlug devices (e.g., between HomePlug 1.0 devices and HomePlug AV devices). In other words, because the HomePlug AV devices are backwards compatible with the HomePlug 1.0 devices (i.e., can detect and read a HomePlug 1.0 packet format), on detecting the presence of HomePlug 1.0 devices in the powerline network 102, the HomePlug AV devices can utilize the hybrid HomePlug AV packet format 300 to maintain coexistence between HomePlug 1.0 and the HomePlug AV devices. As depicted by FIG. 3A, the hybrid HomePlug AV packet 300 comprises a legacy HomePlug 1.0 header 312, a HomePlug AV frame control field 306, and a HomePlug AV payload field 308. The legacy HomePlug 1.0 header 312 comprises a HomePlug preamble 302 and a HomePlug 1.0 frame control field 304. The legacy HomePlug 1.0 header 312 can be transmitted for backward compatibility with the HomePlug 1.0 devices. The HomePlug preamble 302 can comprise a predetermined combination of symbols that indicates a start of packet transmission. The HomePlug 1.0 frame control field 304 and the HomePlug AV frame control field 306 can each comprise an indication of a time interval for which the HomePlug AV packet transmission will occupy the powerline medium (e.g., a packet length field or a transmission duration field). The HomePlug 1.0 devices can receive the HomePlug 1.0 frame control field 304 and determine the time interval for which the HomePlug AV packet transmission will occupy the powerline medium based on reading the HomePlug 1.0 frame control field 304. Other HomePlug AV devices in the powerline network 102 can receive the HomePlug AV Frame Control field 306 and determine the time interval for which the HomePlug AV packet transmission will occupy the powerline medium based on reading the HomePlug AV frame control field 306. The HomePlug payload field 308 can comprise the payload or data (e.g., application/control data) that is intended for a destination HomePlug AV device.

On detecting the hybrid HomePlug AV packet 300, the dual mode G.HN device 110 can determine that the powerline network 102 comprises a hybrid environment including HomePlug 1.0 devices, HomePlug AV devices, and G.HN devices (and/or other dual mode G.HN devices). On determining to initiate a dual mode G.HN transmission, the dual mode G.HN device 110 can select the packet format of the dual mode G.HN packet 350 of FIG. 3B to enable different versions of the HomePlug devices, the G.HN devices, and the dual mode G.HN devices to receive and process the packet (e.g., to determine the transmission duration associated with the dual mode G.HN transmission). As depicted by FIG. 3B, the dual mode G.HN packet 350 comprises the HomePlug 1.0 header 312 (including the HomePlug preamble 302 and the HomePlug 1.0 frame control field 304), a G.HN packet header 354, and a dual mode G.HN payload 356. The HomePlug 1.0 frame control field 304 can comprise an indication (e.g., a packet length field) of a transmission duration for which a transmitting powerline device (e.g., the dual mode G.HN device 110) will transmit the dual mode G.HN packet. Likewise, the G.HN packet header 354 can also comprise an indication (e.g., a packet length field) of the transmission duration for which the dual mode G.HN device 110 will transmit the dual mode G.HN packet. The indication of the transmission duration can be described in terms of a packet length (e.g., a number of data units such as bits or bytes), a period of time, a number of clock cycles, etc.

By providing information about the transmission duration associated with the dual mode G.HN transmission in two separate formats—one that is recognized by the HomePlug devices and the other that is recognized by the G.HN devices, the dual mode G.HN device 110 can maintain coexistence between the dual mode G.HN devices and the HomePlug devices. This can also ensure that both the HomePlug devices 114 and the G.HN devices can receive the appropriate headers from the dual mode G.HN device 110, determine the transmission duration for which the powerline medium will be in use by the dual mode G.HN device 110, and accordingly defer transmitting data during the determined transmission duration (to avoid/minimize interference). Furthermore, the dual mode G.HN payload 356 can comprise the payload or data generated by the dual mode G.HN device 110 that is to be provided to another PLC device (e.g., another dual mode G.HN device, the legacy G.HN device 112, or to the HomePlug device 114).

FIG. 4A is an example format of a second embodiment of a HomePlug AV packet 400, when the HomePlug AV device is configured in an AV-only mode. On determining that the powerline network 102 does not comprise any HomePlug 1.0 devices, the HomePlug AV devices can utilize the HomePlug AV packet format 400 to communicate with other HomePlug AV devices. As depicted by FIG. 4A, the HomePlug AV packet 400 comprises a HomePlug AV header 402 and the HomePlug AV payload field 308. The HomePlug AV header 402 comprises the HomePlug preamble 302 and the HomePlug AV frame control field 306.

On detecting the HomePlug AV packet 400, the dual mode G.HN device 110 can determine that the powerline network 102 comprises only HomePlug AV devices in addition to the G.HN devices and/or other dual mode G.HN devices. On determining to initiate a dual mode G.HN transmission, the dual mode G.HN device 110 can select the packet format 450 of FIG. 4B to enable the HomePlug AV devices, the G.HN devices, and the dual mode G.HN devices of the powerline network 102 to receive and process the packet (e.g., to determine the transmission duration associated with the dual mode G.HN transmission). As depicted by FIG. 4B, the dual mode G.HN packet 450 comprises the HomePlug AV header 402 (including the HomePlug preamble 302 and the HomePlug AV frame control field 306), the G.HN packet header 354, and the dual mode G.HN payload 356.

Figure 5A:
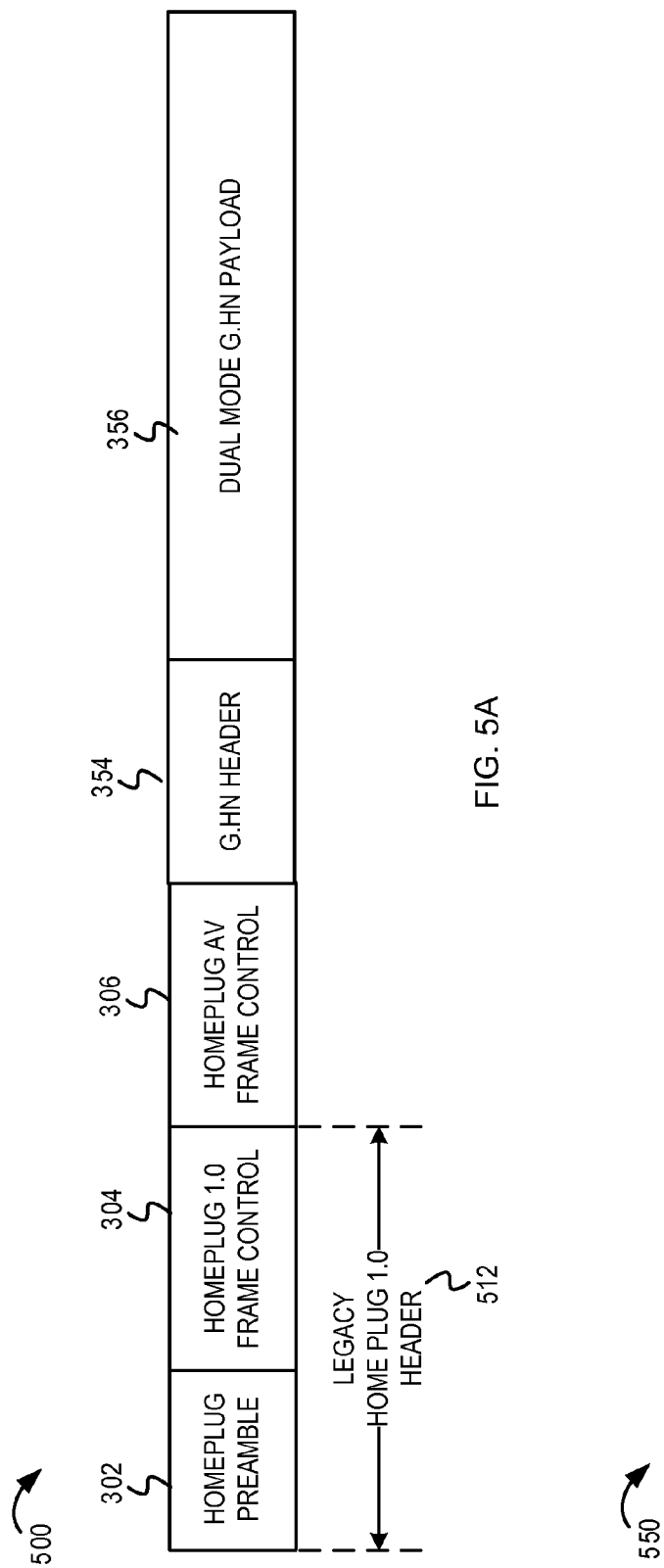
FIG. 5A is an example format of a third embodiment of a dual mode G.HN packet.

In some implementations, when the powerline network 102 comprises a combination of HomePlug 1.0 devices, HomePlug AV devices, and G.HN devices, the dual mode G.HN device may use the dual mode G.HN packet format 500 of FIG. 5A (instead of the packet format 350 of FIG. 3B). The dual mode G.HN packet 500 comprises both HomePlug 1.0 headers and HomePlug AV headers. As depicted in FIG. 5A, the dual mode G.HN packet 500 comprises the HomePlug preamble 302, the HomePlug 1.0 frame control field 304, the HomePlug AV frame control field 306, the G.HN packet header 354, and the dual mode G.HN payload 356. The HomePlug 1.0 devices, the HomePlug AV devices, and the G.HN devices can each determine the transmission duration associated with the dual mode G.HN transmission based on reading the HomePlug 1.0 frame control field 304, the HomePlug AV frame control field 306, and the G.HN packet header 354, respectively. Consequently, the HomePlug 1.0 devices, the HomePlug AV devices, and the G.HN devices can prevent their respective transmissions for the transmission duration associated with the dual mode G.HN transmission.

Figure 5B:
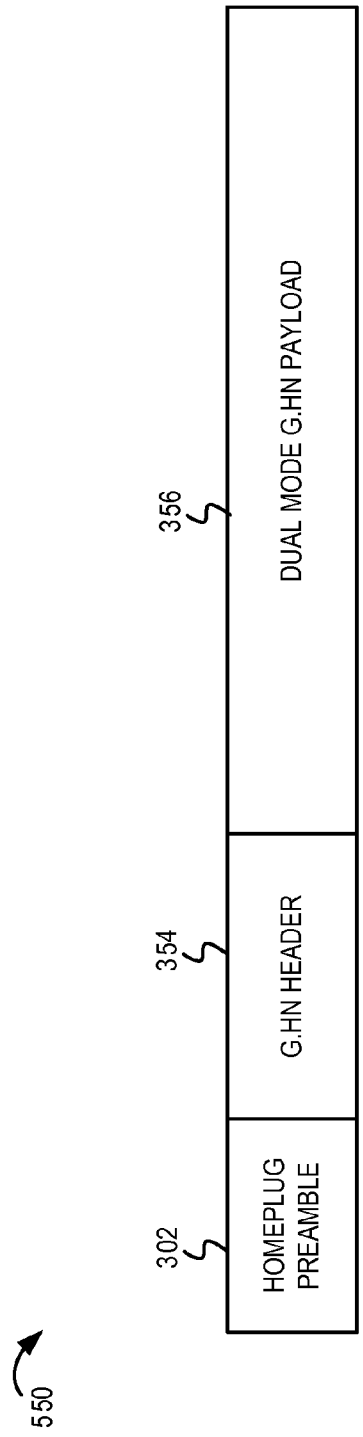
FIG. 5B is an example format of a fourth embodiment of a dual mode G.HN packet.

In some implementations, coexistence between HomePlug devices and the G.HN devices can also be maintained by using the dual mode G.HN packet format 550 of FIG. 5B. As depicted in FIG. 5B, the dual mode G.HN packet 550 comprises the HomePlug preamble 302, the G.HN packet header 354, and the dual mode G.HN payload 356. The HomePlug preamble 302 typically indicates the start of a transmission but does not provide any information about the transmission duration associated with the dual mode G.HN transmission to the HomePlug devices. On detecting the HomePlug preamble 302, the HomePlug devices can attempt to detect a subsequent HomePlug frame control field in order to determine the transmission duration associated with the dual mode G.HN transmission. In response to determining that the dual mode G.HN packet 550 does not comprise a valid HomePlug frame control field (i.e., on detecting the start on the packet transmission but failing to detect an indication of the end of the transmission), the HomePlug devices can prevent HomePlug transmissions for a predetermined time interval. In one implementation, the predetermined time interval can be an extended inter-frame space interval defined by HomePlug communication standards. In another implementation, the predetermined time interval can be any suitable configurable time interval. Such a packet format for enabling coexistence between the HomePlug devices and the G.HN device can minimize the overhead and implementation cost associated with transmitting the dual mode G.HN packet and can improve the throughput associated with transmitting the dual mode G.HN packet.

It is noted that the packet formats described with reference to FIGS. 3A, 3B, 4A, 4B, 5A, and 5B can comprise any suitable number of fields and each field can comprise any suitable number of bits. Furthermore, the packet formats can be encoded using any suitable encoding scheme. In some implementations, different fields within the same packet can be encoded using different encoding schemes. For example, the HomePlug 1.0 frame control field 304 can be encoded using a Turbo products convolutional code and the HomePlug AV frame control field 306 can be encoded using a Turbo convolutional (parallel concatenated) code.

Figure 6:
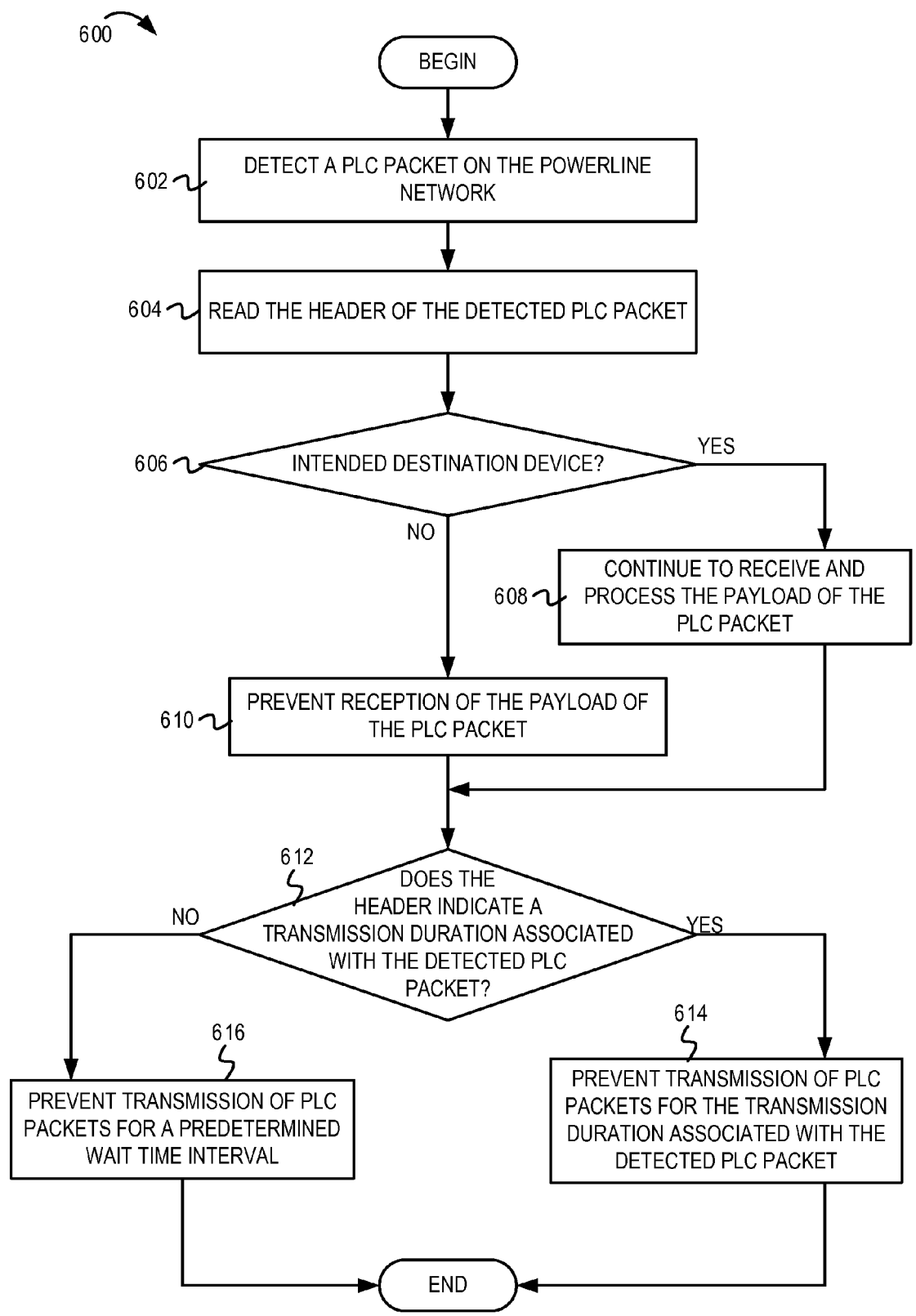
FIG. 6 is a flow diagram illustrating example operations for processing a PLC packet.

FIG. 6 is a flow diagram 600 illustrating example operations for processing a PLC packet. The flow 600 begins at block 602.

At block 602, a PLC packet is detected on the powerline network. For example, the transceiver 120 of the dual mode G.HN device 110 can detect the PLC packet based on detecting a preamble of the PLC packet. The flow continues at block 604.

At block 604, the header of the detected PLC packet is read. For example, the processing unit 124 can read the header of the detected PLC packet. As will be described below, based on reading the header of the detected PLC packet, the processing unit 124 can determine whether to continue receiving a payload of the PLC packet and can also determine a time interval for which the powerline medium will be in use. The flow continues at block 606.

At block 606, it is determined whether the detected PLC packet is intended for the dual mode G.HN device. In one implementation, the processing unit 124 can determine whether the detected PLC packet is intended for the dual mode G.HN device 110. For example, the processing unit 124 can read a destination address field in the header of the detected PLC packet. The processing unit 124 can determine whether the value in the destination address field matches an address associated with the dual mode G.HN device 110. If it is determined that the detected PLC packet is intended for the dual mode G.HN device 110, the flow continues at block 608. Otherwise, the flow continues at block 610.

At block 608, the payload of the PLC packet is received and processed. The flow 600 moves from block 606 to block 608 if the processing unit 124 determines that the detected PLC packet is intended for the dual mode G.HN device 110. On determining that the detected PLC packet is intended for the dual mode G.HN device 110, the processing unit 124 can begin to receive the payload of the PLC packet. The processing unit 124 can also process (e.g., decode, demodulate, and retrieve data from) the payload of the PLC packet. The flow continues at block 612.

At block 610, the reception of the payload of the PLC packet is prevented. The flow 600 moves from block 606 to block 610 if the processing unit 124 determines that the detected PLC packet is not intended for the dual mode G.HN device 110. On determining (based on the header of the PLC packet) that the PLC packet is not intended for the dual mode G.HN device 110, the processing unit 124 can prevent reception of the payload of the PLC packet. The flow continues at block 612.

At block 612, it is determined whether the header of the detected PLC packet indicates a transmission duration associated with the detected PLC packet. For example, the processing unit 124 can determine whether the header of the detected PLC packet indicates the transmission duration associated with the detected PLC packet. In one implementation, the header of the PLC packet can comprise a length field that indicates the length (e.g., in bytes, etc.) of the PLC packet. The length field in conjunction with a transmission data rate of the PLC packet can be used to calculate the transmission duration when the powerline medium will be in use (i.e., the duration of time required to complete transmission of the PLC packet). In another implementation, the header of the PLC packet can comprise a duration field that indicates the transmission duration (e.g., in milliseconds). If it is determined that the header of the detected PLC packet indicates the transmission duration associated with the detected PLC packet, the flow continues at block 614. Otherwise, the flow continues at block 616.

At block 614, transmission of PLC packets is prevented for the transmission duration associated with the detected PLC packet. For example, the processing unit 124 can prevent the transceiver 120 from transmitting PLC packets for the transmission duration associated with the detected PLC packet. The flow 600 moves from block 612 to block 614 if the processing unit 124 determines that the header indicates the transmission duration associated with the PLC packet. From block 614, the flow ends.

At block 616, transmission of PLC packets is prevented for a predetermined wait time interval. For example, the processing unit 124 can prevent the transceiver 120 from transmitting PLC packets for the predetermined wait time interval. The flow 600 moves from block 612 to block 616 if the processing unit 124 determines that the header does not indicate the transmission duration associated with the PLC packet. In one implementation, the predetermined wait time interval may be selected based on a maximum packet length of the G.HN packets or a maximum packet length of the HomePlug packets. For example, if the processing unit 124 determines that a HomePlug device transmitted the PLC packet (detected at block 602), the processing unit 124 may prevent transmission of PLC packets of the dual mode G.HN device 110 for a predetermined wait time interval calculated based on the maximum packet length of the HomePlug packets. From block 616, the flow ends.

In some implementations, when the powerline network 102 comprises HomePlug devices and G.HN devices, access to the powerline medium can be provided to either the HomePlug devices, the dual mode G.HN devices, or the G.HN devices based on the priority of pending transmissions. In one implementation, the PLC devices (i.e., the G.HN devices, the dual mode G.HN devices, and the HomePlug devices) can use priority resolution slots to identify pending transmissions with the highest priority. The PLC devices that comprise pending transmissions associated with the highest priority can contend for the powerline medium to avoid collisions, as will be further described with reference to FIGS. 7 and 9A.

Figure 7:
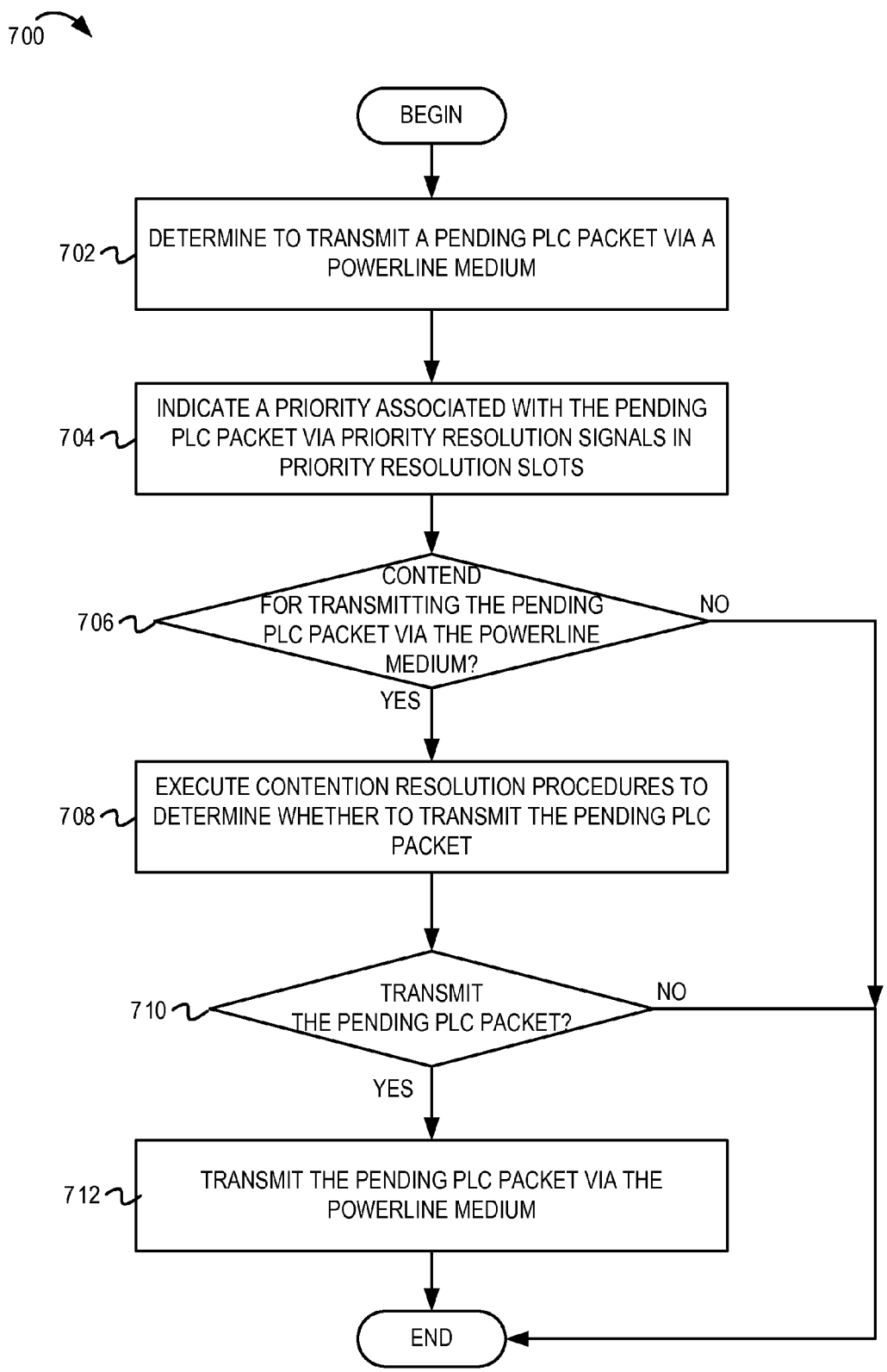
FIG. 7 is a flow diagram illustrating example contention resolution operations for powerline medium access.

FIG. 7 is a flow diagram 700 illustrating example contention resolution operations for powerline medium access. The flow 700 begins at block 702.

At block 702, a dual mode device of a powerline network determines to transmit a pending PLC packet via a powerline medium. For example, the processing unit 124 of the dual mode G.HN device 110 can determine to transmit the pending PLC packet via the powerline medium that comprises the powerline network 102. As described above, the pending PLC packet can comprise a G.HN packet header (if the powerline network 102 comprises only G.HN devices and/or dual mode G.HN devices) or a compatibility packet header (if the powerline network 102 also comprises HomePlug devices). The pending PLC packet can also comprise a dual mode G.HN payload 354. The flow continues at block 704.

Figure 9A:
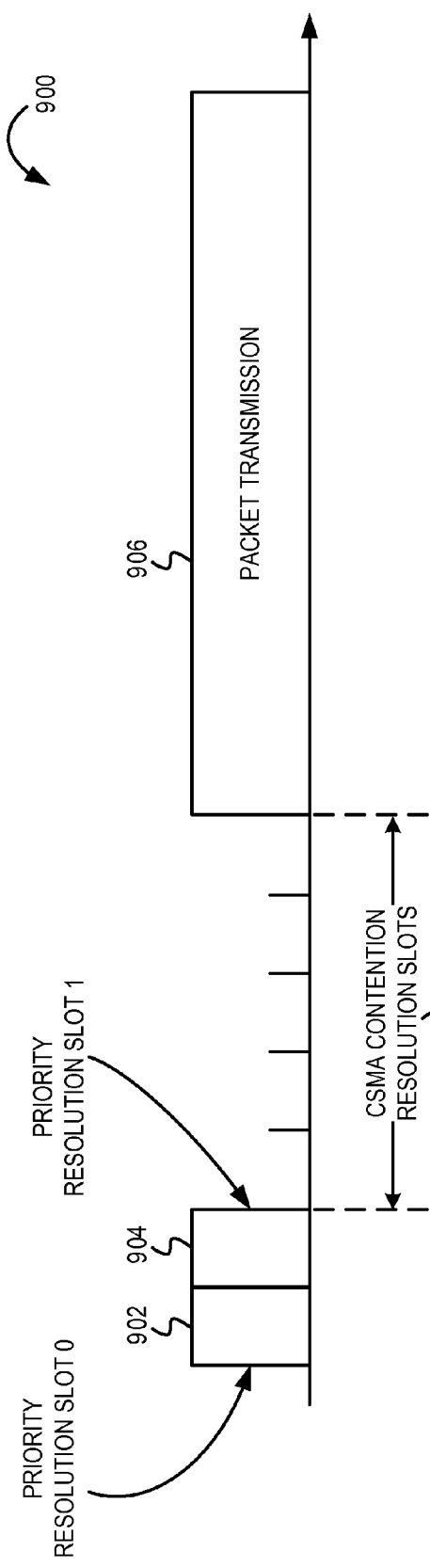
FIG. 9A is an example timing diagram illustrating contention resolution operations for powerline medium access.

At block 704, a priority associated with the pending PLC packet is indicated via priority resolution signals in priority resolution time slots. For example, the channel access unit 130 can determine the priority associated with the pending PLC packet. Based on the priority associated with the pending PLC packet, the channel access unit 130 can determine whether the priority resolution signals should be transmitted, how many priority resolution signals should be transmitted, and when (e.g., in which of the priority resolution time slots) the priority resolution signals should be transmitted. In one implementation, the channel access unit 130 can implement a priority resolution mechanism for prioritized access of the powerline medium in a distributed manner. For example, the channel access unit 130 may implement a HomePlug priority resolution mechanism that provides four priority levels. The channel access unit 130 can indicate a priority level associated with the pending PLC packet by transmitting zero or more priority resolution signals across two consecutive priority resolution slots. FIG. 9A depicts an example timing diagram 900 for powerline medium access. The timing diagram 900 illustrates two priority resolution slots—priority resolution slot zero 902 and priority resolution slot one 904. In a four-priority level resolution mechanism, transmissions associated with the highest priority (e.g., a priority level of 3) can be identified by transmitting priority resolution signals in both the priority resolution slots 902 and 904. The transmissions associated with the second highest priority (e.g., a priority level of 2) can be identified by transmitting a priority resolution signal only in the priority resolution slot 902 and by not transmitting the priority resolution signal in the priority resolution slot 904. The transmissions associated with the third highest priority (e.g., a priority level of 1) can be identified by transmitting a priority resolution signal only in the priority resolution slot 904 and by not transmitting the priority resolution signal in the priority resolution slot 902. Priority resolution signals may not be transmitted in either of the priority resolution slots 902 and 904 if the pending transmissions are associated with the lowest priority (e.g., a priority level of 0). In one implementation, the priority resolution signals can comprise a spread spectrum signal that has a high tolerance-to-delay spread and that is very robust, to minimize destructive interference when multiple PLC devices transmit priority resolution signals in the same priority resolution slot. The channel access unit 130 can cause the transceiver 120 to transmit the priority resolution signals via the powerline medium to indicate the priority associated with the pending PLC packet to other PLC devices of the powerline network 102. The flow continues at block 706.

At block 706, it is determined whether to contend for transmitting the pending PLC packet via the powerline medium. For example, the channel access unit 130 can determine whether to contend for control of the powerline medium. In addition to transmitting the priority resolution signals (except when the pending PLC packet is associated with the lowest priority level) during the priority resolution slots 902 and 904, the channel access unit 130 can also listen for priority resolution signals transmitted by other PLC devices. For example, in the four level priority resolution mechanism, if the pending PLC packet is associated with a priority level of 2, the channel access unit 130 can transmit the priority resolution signal in the priority resolution slot 902 and can listen for priority resolution signals in the priority resolution slot 904. As another example, if the pending PLC packet is associated with a priority level of 1, the channel access unit 130 can listen for a priority resolution signal in the priority resolution slot 902 and can transmit a priority resolution signal in the priority resolution slot 904, if it does not detect any priority resolution signal in the priority resolution slot 902. As another example, if the pending PLC packet is associated with a priority level of 0, the channel access unit 130 can listen for priority resolution signal in both the priority resolution slots 902 and 904. If the channel access unit 130 detects a priority resolution signal in the priority resolution slot when it is programmed to listen, the channel access unit 130 can determine that there are other PLC devices with pending PLC packets associated with a higher priority. Consequently, the channel access unit 130 can determine not to contend for control of the powerline medium. For example, PLC devices connected to the powerline network 102 may comprise pending PLC packets associated with one of the four priority levels. The PLC devices with pending PLC packets associated with priority levels 2 and 3 (i.e., the two highest priority levels) can transmit a priority resolution signal in the priority resolution slot 902. The PLC devices with pending PLC packets associated with priority levels 0 and 1 (i.e., the two lowest priority levels) can detect the priority resolution signal in the priority resolution slot 902, determine not to contend for the powerline medium, and defer to the PLC devices with the pending PLC packets associated with the higher priority. The PLC devices with pending PLC packets associated with the highest priority level 3 can then transmit a priority resolution signal in the priority resolution slot 904. The PLC devices with pending PLC packets associated with the priority level 2 can detect the priority resolution signal in the priority resolution slot 904, can determine not to contend for the powerline medium, and defer to the PLC devices with the pending PLC packets associated with the higher priority level 3. Thus, only the PLC devices with pending PLC packets associated with the priority level 3 may contend for control of the powerline medium. If it is determined to contend for control of the powerline medium, the flow continues at block 708. Otherwise, the flow ends.

At block 708, contention resolution procedures are executed to determine whether to transmit the pending PLC packet. For example, the channel access unit 130 in conjunction with the transceiver 120 can execute the contention resolution procedures during contention time slots 908 (of FIG. 9A) to determine whether to transmit the pending PLC packet. The flow 700 moves from block 706 to block 708 if the channel access unit 130 determines that the pending PLC packet (determined at block 702) is associated with the highest priority. In one implementation, the channel access unit 130 can execute carrier sense multiple access (CSMA) contention resolution procedures. The channel access unit 130 can wait for a randomly selected delay interval and can then cause the transceiver 120 to transmit the pending PLC packet (if the powerline medium is not in use). The flow continues at block 710.

At block 710, it is determined whether to transmit the pending PLC packet. For example, the channel access unit 130 can determine whether to transmit the pending PLC packet. As described above, in accordance with the contention resolution procedures, the channel access unit 130 (associated with each PLC device contending for control of the powerline medium) can wait for a randomly selected delay interval. After the randomly selected delay interval expires, the channel access unit 130 can sense the powerline medium to determine whether the powerline medium is still idle or whether another PLC device (that was also contending for the powerline medium) has gained control of the powerline medium. If the channel access unit 130 determines that another contending PLC device has not gained control of the powerline medium, the channel access unit 130 determines to transmit the pending PLC packet and the flow continues at block 712. Otherwise, the flow ends.

At block 712, the pending PLC packet is transmitted via the powerline medium. For example, the transceiver 120 can transmit the pending PLC packet via the powerline medium for a transmission duration 906. From block 712, the flow ends.

It is noted that although FIG. 7 depicts the flow 700 coming to an end if the channel access unit 130 determines not to contend for control of the powerline medium, or if the channel access unit 130 does not gain control of the powerline medium after executing the contention resolution procedures, embodiments are not so limited. In other embodiments, if the channel access unit 130 is unable to transmit the pending PLC packet, the channel access unit 130 can wait for the transmission duration 906 associated with the PLC packet being transmitted and then attempt to contend for control of the powerline medium again.

Furthermore, in some implementations, the channel access unit 130 can select an appropriate priority resolution mechanism and an appropriate contention resolution mechanism based on the classes of PLC devices connected to the powerline network 102. For example, if the powerline network 102 comprises only HomePlug devices and dual mode G.HN devices, the channel access unit 130 can determine to implement a HomePlug priority resolution mechanism and a corresponding HomePlug contention resolution mechanism. Alternately, if the powerline network 102 comprises only G.HN devices and dual mode G.HN devices, the channel access unit 130 can determine to implement a G.HN priority resolution mechanism and a corresponding G.HN contention resolution mechanism.

In some implementations, the dual mode G.HN device may only use the compatibility packet headers described with reference to FIGS. 3B, 4B, 5A, and 5B during intervals of time when HomePlug devices are detected on the powerline network 102 or during intervals of time when the HomePlug devices are scheduled to transmit HomePlug packets. In some implementations, communication time intervals can be allocated for HomePlug and G.HN communication (e.g., using the compatibility packet headers) and for only G.HN communication (e.g., using only G.HN packet headers) as will be described below with reference to FIG. 8 and FIG. 9B.

Figure 8:
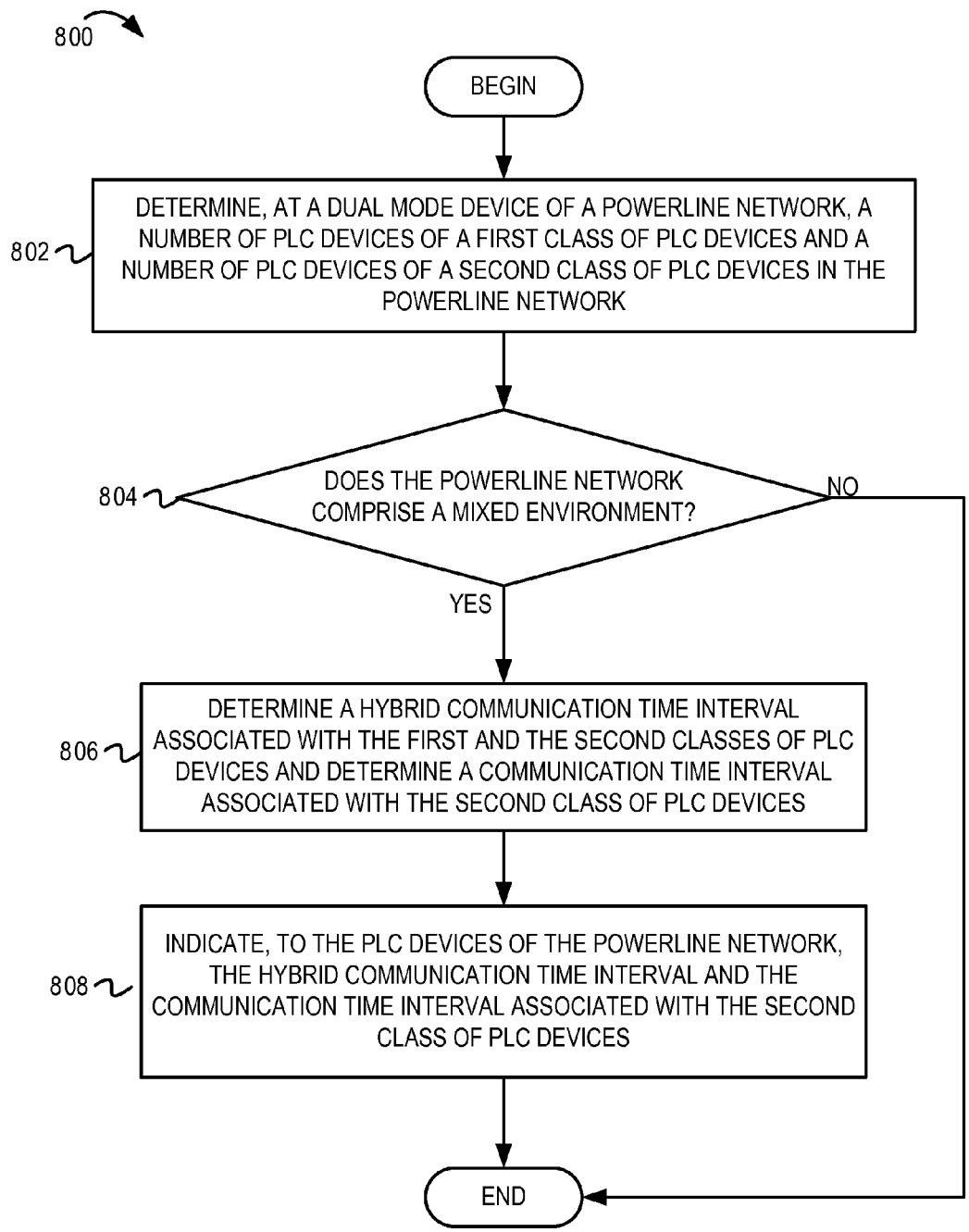
FIG. 8 is a flow diagram illustrating example operations for determining and allocating communication time intervals.

FIG. 8 is a flow diagram 800 illustrating example operations for determining and allocating communication time intervals. The flow begins at block 802.

At block 802, it is determined, at a dual mode device of a powerline network, a number of PLC devices of a first class of PLC devices and a number of PLC devices of a second class of PLC devices in the powerline network. For example, the operating mode configuration unit 122 of the dual mode G.HN device 110 can determine a number of HomePlug devices (i.e., the PLC devices of the first class of PLC devices) and a number of G.HN devices (i.e., the PLC devices of the second class of PLC devices) connected to the powerline network 102. In some implementations, the operating mode configuration unit 122 may not determine an exact number of HomePlug devices or G.HN devices in the powerline network 102. Instead, based on the format of packets received at the dual mode G.HN device 110, the operating mode configuration unit 122 can identify the presence of various PLC devices in the powerline network 102. The flow continues at block 804.

At block 804, it is determined whether the powerline network comprises a mixed environment. For example, the operating mode configuration unit 122 can determine whether the powerline network 102 comprises both HomePlug devices and G.HN devices. In one implementation, the operating mode configuration unit 122 can determine whether the number of HomePlug devices connected to the powerline network and the number of G.HN devices connected to the powerline network 102 are both greater than zero. If the operating mode configuration unit 122 determines that the powerline network 102 comprises a mixed environment, the flow continues at block 806. Otherwise, the flow ends.

Figure 9B:
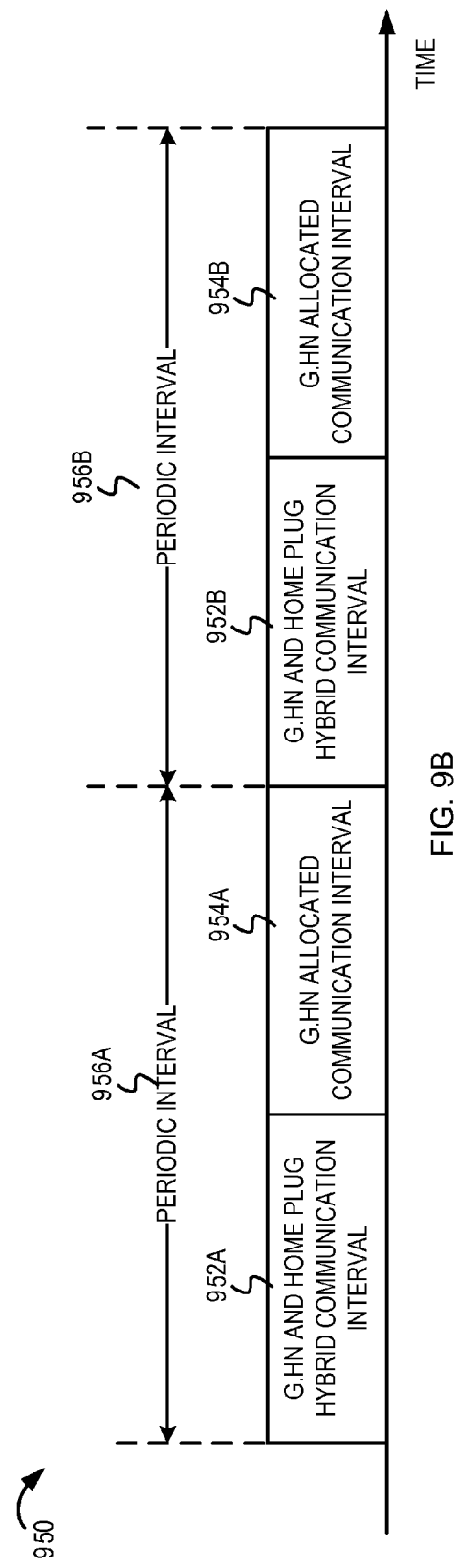
FIG. 9B is an example timing diagram illustrating communication time intervals allocated to different classes of PLC devices.

At block 806, a communication time interval associated with the mixed environment ("hybrid communication time interval") and a communication time interval associated with the second class of PLC devices is determined. For example, the operating mode configuration unit 122 can divide the time on the powerline medium into intervals of time during which only the G.HN devices or all the PLC devices connected to the powerline network 102 can transmit their respective packets. In one implementation, the operating mode configuration unit 122 can divide the time on the powerline medium using time division multiple access (TDMA) allocation schemes supported by the G.HN devices and the HomePlug devices. In another implementation, the operating mode configuration unit 122 can divide the time on the powerline medium using any suitable coexistence mechanism such as Inter System Protocol (ISP) or G.cx. For example, with reference to the timing diagram 950 of FIG. 9B, the operating mode configuration unit 122 can determine the hybrid communication time interval 952A and 952B during which both the HomePlug devices and the G.HN devices can transmit HomePlug packets and G.HN packets, respectively. The operating mode configuration unit 122 can also determine the communication time interval associated with the G.HN devices ("G.HN communication time interval") 954A and 954B during which only the G.HN devices and the dual mode G.HN devices can communicate. As depicted in FIG. 9B, the hybrid communication time interval 952A and the G.HN communication time interval 954A together comprise one PLC communication interval 956A during which all the PLC devices get an opportunity to contend for the powerline medium. In some implementations, these PLC communication intervals can be consecutive and periodically repeating time intervals. As depicted by FIG. 9B, after the PLC communication interval 956A elapses, the next PLC communication interval 956B comprising the hybrid communication time interval 952B and the G.HN communication time interval 954B begins. In one implementation, the time period associated with the hybrid communication time interval and the G.HN communication time interval can be predefined. In another implementation, the hybrid communication time interval and the G.HN communication time interval can be calculated based on one or more of the number of HomePlug devices in the powerline network 102, the number of G.HN devices in the powerline network 102, a traffic load of the HomePlug devices, a traffic load of the G.HN devices, priority associated with communications of the G.HN devices, priority associated with communications of the HomePlug devices, and bandwidth requirements associated with the HomePlug devices and the G.HN devices. It is noted that, in some implementations, the operating mode configuration unit 122 may be configured to dynamically vary the hybrid communication time interval and the G.HN communication time interval depending on variations to the HomePlug traffic and the G.HN traffic. The flow continues at block 808.

At block 808, the hybrid communication time interval and the communication time interval associated with the second class of PLC devices is indicated to the PLC devices connected to the powerline network. For example, the operating mode configuration unit 122 can cause the transceiver 120 to provide an indication of the hybrid communication time interval and the G.HN communication time interval to all the HomePlug devices and the G.HN devices connected to the powerline network 102. In one implementation, the operating mode configuration unit 122 can provide the indication of the hybrid communication time interval and the G.HN communication time interval to other dual mode G.HN devices connected to the powerline network 102. In other implementations, however, each of the other dual mode G.HN devices can independently calculate the hybrid communication time interval and the G.HN communication time interval. From block 808, the flow ends.

It should be understood that FIGS. 1-9B are examples meant to aid in understanding embodiments and should not be used to limit embodiments or limit scope of the claims. Embodiments may perform additional operations, fewer operations, operations in a different order, operations in parallel, and some operations differently. For example, if the operating mode configuration unit 122 detects that the powerline network 102 does not comprise a mixed environment, the operating mode configuration unit 122 can determine that the powerline network 102 comprises only HomePlug devices or only G.HN devices. Consequently, the operating mode configuration unit 122 can determine whether the powerline network 102 comprises only HomePlug devices or whether the powerline network 102 comprises only G.HN devices. If the powerline network 102 comprises only HomePlug devices, the dual mode G.HN device 110 can determine (and indicate to other dual mode G.HN devices) to use one the compatibility packet headers (described above with reference to FIGS. 3B, 4B, 5A, and 5B) for dual mode G.HN transmissions. If the powerline network 102 comprises only G.HN devices, the dual mode G.HN device 110 can determine (and indicate to other dual mode G.HN devices) to use the G.HN packet header for dual mode G.HN transmissions.

In some implementations, the dual mode G.HN device 110 can encapsulate data to be transmitted in the compatibility packet header only during intervals of time when the HomePlug devices connected to the powerline network 102 are expected to transmit a HomePlug packet. The dual mode G.HN device 110 can determine (or receive) an indication of a communication schedule associated with the HomePlug devices connected to the powerline network 102. Accordingly, prior to generating a dual mode G.HN packet, the dual mode G.HN device 110 can determine whether the HomePlug devices are in a low powered state or whether the HomePlug devices are scheduled to transmit a HomePlug packet. If it is determined that the HomePlug devices are in the low powered state, the packet generation unit 128 can generate the dual mode G.HN packet using the G.HN packet header. If it is determined that at least one of the HomePlug devices is scheduled to transmit a packet, the packet generation unit 128 can generate the dual mode G.HN packet using one of the compatibility packet headers, as described in FIG. 3B, 4B, 5A, or 5B.

With reference to FIG. 8, it is noted that if the operating mode configuration unit 122 determines that the powerline network 102 comprises a mixed environment, the operating mode configuration unit 122 can determine the hybrid communication interval, the G.HN communication interval, and also a communication time interval associated with the HomePlug devices ("HomePlug communication time interval"). As described above, in one implementation, the time period associated with the hybrid communication interval, the G.HN communication interval, and the HomePlug communication time interval can be predefined. In another implementation, the hybrid communication interval, the G.HN communication interval, and the HomePlug communication time interval can be dynamically calculated (and varied) based on the number of HomePlug devices and G.HN devices connected to the powerline network 102, and other such factors.

Furthermore, in some implementations, the dual mode G.HN device 110 can be configured as a master device (or a controlling device) of the powerline network 102. The master dual mode G.HN device 110 can determine the hybrid communication time interval, the HomePlug communication time interval, and/or the G.HN communication time interval. The master dual mode G.HN device 110 can indicate, to the HomePlug devices, a time instant at which the HomePlug devices can begin to initiate HomePlug transmissions, a duration for which the HomePlug devices can communicate (i.e., the HomePlug communication time interval), and a time instant at which the HomePlug devices should cease all HomePlug transmissions and switch to the low powered state. Likewise, the master dual mode G.HN device 110 can indicate, to the G.HN devices, a time instant at which the G.HN devices can begin to initiate G.HN transmissions, a duration for which the G.HN devices can communicate (i.e., the G.HN communication time interval), and a time instant at which the G.HN devices should cease all G.HN transmissions and switch to the low powered state. Dual mode G.HN devices may transmit at any time using appropriate packet headers. The dual mode G.HN devices 110 can transmit dual mode G.HN packets using the compatibility packet headers during the HomePlug communication time interval and can transmit dual mode G.HN packets using the G.HN packet header during the G.HN communication time interval.

In some implementations, the dual mode G.HN device 110 can use a suitable dual mode G.HN packet format (described in FIGS. 3B, 4B, 5A, and 5B) to translate and provide information received from one class of PLC devices to another incompatible class of PLC devices. For example, the dual mode G.HN device 110 may determine the communication schedule of the HomePlug devices and may provide the communication schedule of the HomePlug devices to the G.HN devices. Likewise, the dual mode G.HN device 110 may determine the communication schedule of the G.HN devices and may use the packet format 350 to provide the communication schedule of the G.HN devices to the HomePlug devices.

Lastly, in some implementations, on receiving a PLC packet from a PLC device (e.g., a HomePlug device, a G.HN device, a dual mode G.HN device, etc.), the dual mode G.HN device 110 can process the received PLC packet depending on the PLC device that transmitted the PLC packet. The processing unit 124 of the dual mode G.HN device 110 can implement various techniques to process the received PLC packet. In one implementation, based on whether the powerline network 102 comprises a mixed environment (e.g., based on whether the powerline network 102 comprises both HomePlug devices and G.HN devices), the processing unit 124 can determine how to process the received PLC packet. In another implementation, the processing unit 124 can determine how to process the received PLC packet the based on a time interval during which the PLC packet was received. For example, if the processing unit 124 determines that the PLC packet was received during the hybrid communication time interval 952A of FIG. 9B, the processing unit 124 can determine that the received PLC packet probably comprises one of the compatibility packet headers described above in FIGS. 3B, 4B, 5A, and 5B. In another implementation, the processing unit 124 may comprise functionality to analyze a header of the received PLC packet and dynamically determine how to process the received PLC packet. For example, the processing unit 124 may determine, based on analyzing a header of the received PLC packet, that a G.HN device transmitted the PLC packet using a G.HN packet header. Accordingly, the processing unit 124 can process the PLC packet in accordance with G.HN processing techniques. Furthermore, it is noted that in some implementations, the operating mode configuration unit 122 may analyze the received PLC packet to determine whether the transmitting powerline device is the G.HN device 112 or the HomePlug device 114. If it is determined that the HomePlug device 114 transmitted the PLC packet, the operating mode configuration unit 122 may direct a HomePlug processing unit (not shown) of the processing unit 124 to process the received PLC packet. Alternately, if it is determined that the G.HN device 112 transmitted the PLC packet, the operating mode configuration unit 1022 may direct a G.HN processing unit (not shown) of the processing unit 124 to process the received PLC packet.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 10:
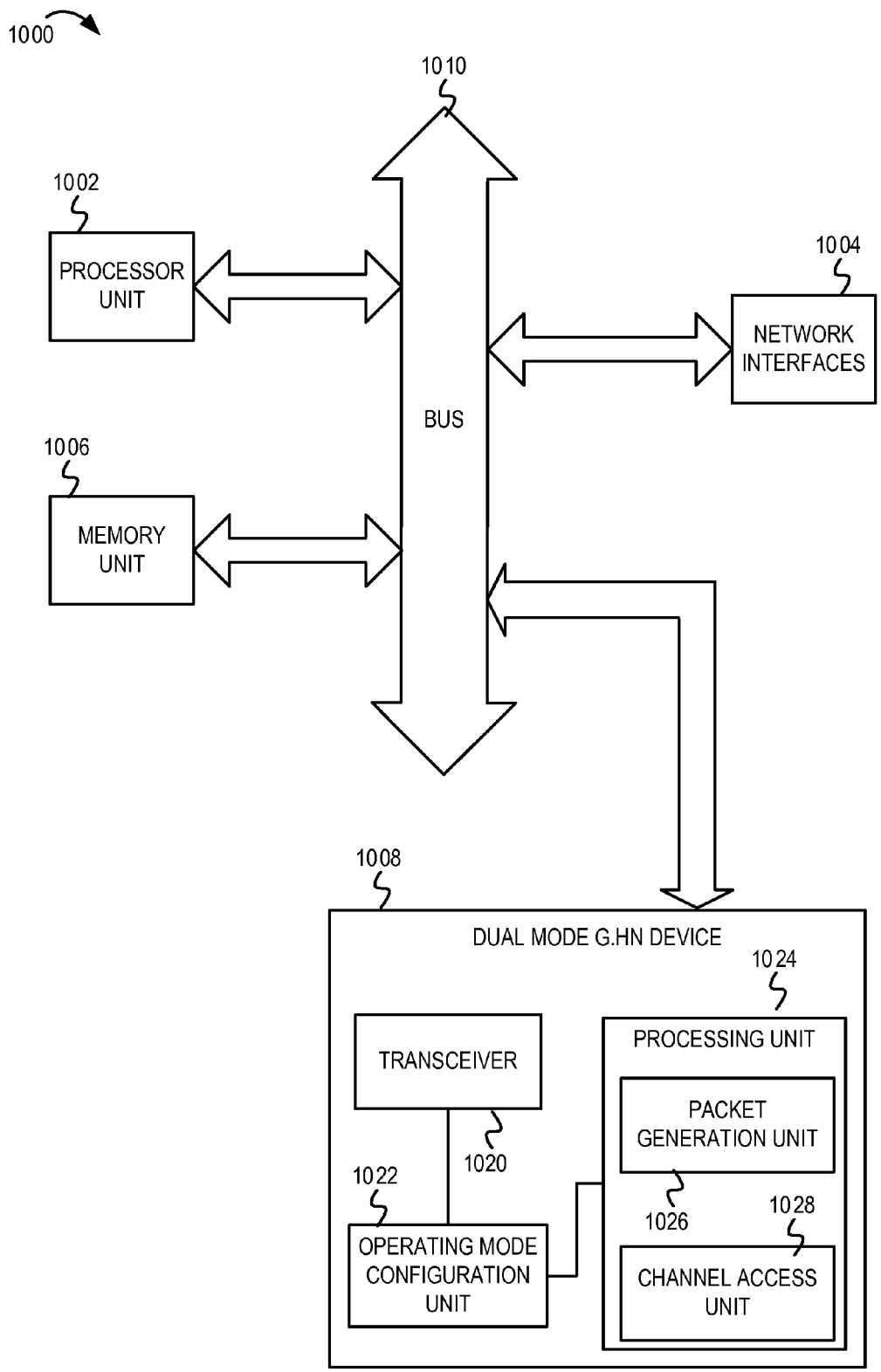
FIG. 10 is a block diagram of one embodiment of an electronic device including a mechanism for maintaining coexistence between powerline communication devices.

FIG. 10 is a block diagram of one embodiment of an electronic device including a mechanism for maintaining coexistence between powerline communication devices. In some implementations, the electronic device 1000 may be a personal computer (PC), a laptop, a netbook, a mobile phone, a personal digital assistant (PDA), a smart appliance, or other electronic systems configured to communicate across a wired network (e.g., a powerline network or an Ethernet network) or a wireless communication network (e.g., WLAN). The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1010 (e.g., PCI, ISA, PCI-Express, HyperTransport®, InfiniBand®, NuBus, AHB, AXI, etc.), and network interfaces 1004 that include at least one wired network interface (e.g., a powerline communication interface) or a wireless network interface (e.g., a WLAN interface, a Bluetooth® interface, a WiMAX interface, a ZigBee® interface, a Wireless USB interface, etc.).

The electronic device 1000 also includes a dual mode G.HN device 1008. The dual mode G.HN device 1008 comprises a transceiver 1020, an operating mode configuration unit 1022, and a processing unit 1024. The processing unit 1024 comprises a packet generation unit 1026 and a channel access unit 1028. The dual mode G.HN device 1008 can implement functionality to enable compatibility between HomePlug devices and G.HN devices connected to a powerline network. As described with reference to FIGS. 1-6, the dual mode G.HN device 1008 can select an appropriate packet header (for transmitting a dual mode G.HN packet) and can process received PLC packets depending on whether the powerline network comprises a mixed environment. As described with reference to FIGS. 7 and 9A, the dual mode G.HN device 1008 can contend for transmitting the dual mode G.HN packet. As described with reference to FIGS. 8 and 9B, the dual mode G.HN device 1008 can allocate time intervals during which one or more classes of PLC devices can communicate.

It should be noted that any one of the above-described functionalities might be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., additional network interfaces, peripheral devices, etc.). The processor unit 1002 and the network interfaces 1004 are coupled to the bus 1010. Although illustrated as being coupled to the bus 1010, the memory unit 1006 may be coupled to the processor unit 1002. Furthermore, in some implementations, the dual mode G.HN device 1008 can be implemented on a separate chip, a system on a chip (SoC), an application-specific integrated circuit (ASIC), circuit board, etc., within the electronic device 1000 (e.g., coupled with the motherboard of the electronic device 1000), or distinct from the electronic device 1000 (and may or may not be externally coupled with the electronic device 1000).

While the embodiments are described with reference to various implementations and exploitations, it will be understood that these embodiments are illustrative and that the scope of the inventive subject matter is not limited to them. In general, techniques for coexistence mechanism for non-compatible powerline communication devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a dual mode powerline communication device, whether a powerline communication network comprises a combination of powerline device classes including a powerline communication device of a first class of powerline communication devices and a powerline communication device of a second class of powerline communication devices; and
   in response to determining that the powerline communication network comprises the combination of powerline device classes, performing operations comprising:
   selecting, at the dual mode powerline communication device, a packet header that is compatible with the first class of powerline communication devices and the second class of powerline communication devices, wherein the selected packet header includes a first portion including a first header compatible with the first class of powerline communication devices and a second portion including a second header compatible with the second class of powerline communication devices,
   generating, at the dual mode powerline communication device, a packet for transmission based, at least in part, on the selected packet header,
   executing, at the dual mode powerline communication device, contention resolution procedures in response to determining to contend for control of a powerline medium,
   determining, at the dual mode powerline communication device, whether the contention resolution procedures are successful,
   transmitting the packet via the powerline communication network in response to determining that the contention resolution procedures are successful, and
   determining, at the dual mode powerline communication device, to not transmit the packet via the powerline communication network in response to determining that the contention resolution procedures are not successful.

2. The method of claim 1, further comprising:
   determining, at the dual mode powerline communication device, that the powerline communication network comprises the powerline communication device of the second class of powerline communication devices, in response to determining that the powerline communication network does not comprises a combination of powerline device classes
   in response to determining that the powerline communication network comprises the powerline communication device of the second class of powerline communication devices, performing operations comprising:

selecting, at the dual mode powerline communication device, a packet header that is compatible with the second class of powerline communication devices, and generating, at the dual mode powerline communication device, a second packet for transmission based, at least in part, on the selected packet header that is compatible with the second class of powerline communication devices.

3. The method of claim 1, wherein the first class of powerline communication devices comprises one or more of a HomePlug 1.0 device and a HomePlug AV device, and wherein the second class of powerline communication devices comprises a G.HN device.

4. The method of claim 1, wherein said selecting the packet header is based on at least one of a version associated with the first class of powerline communication devices, whether the powerline communication device of the first class of powerline communication devices is enabled, and whether the powerline communication device of the second class of powerline communication devices is enabled.

5. The method of claim 1, further comprising:
receiving, via the powerline communication network, a second packet at the dual mode powerline communication device;

determining, at the dual mode powerline communication device, whether the second packet was received from powerline communication device of the first class of powerline communication devices or the powerline communication device of the second class of powerline communication devices;

processing the second packet in accordance with processing operations associated with the first class of powerline communication devices, in response to determining that the second packet was received from the powerline communication device of the first class of powerline communication devices; and processing the second packet in accordance with processing operations associated with the second class of powerline communication devices, in response to determining that the second packet was received from the powerline communication device of the second class of powerline communication devices.

6. The method of claim 5, wherein said determining whether the second packet was received from the powerline communication device of the first class of powerline communication devices or from the powerline communication device of the second class of powerline communication devices comprises one of:

reading a header associated with the second packet for said determining whether the second packet was received from the powerline communication device of the first class of powerline communication devices or from powerline communication device of the second class of powerline communication devices, receiving an indication of whether the second packet was provided by the powerline communication device of the first class of powerline communication or from the powerline communication device of the second class of powerline communication devices, and determining whether the second packet was received during a communication time interval allocated for the first class of powerline communication devices or during a communication time interval allocated for the second class of powerline communication devices.

7. The method of claim 1, further comprising:
determining, at the dual mode powerline communication device, that the powerline communication device of the first class of powerline communication devices is disabled; and configuring the dual mode powerline communication device to operate in accordance with communication standards associated with the second class of powerline communication devices in response to determining that the powerline communication device of the first class of powerline communication devices is disabled.

8. The method of claim 1, further comprising:
receiving a second packet at the dual mode powerline communication device;

determining, at the dual mode powerline communication device, a transmission duration associated with the second packet based, at least in part, on a header associated with the second packet;

determining, at the dual mode powerline communication device, whether the second packet is intended for the dual mode powerline communication device;

in response to determining that the second packet is not intended for the dual mode powerline communication device,
determining not to receive and process a payload associated with the second packet;
suspending transmissions of the dual mode powerline communication device for at least the transmission duration associated with the second packet; and in response to determining that the second packet is intended for the dual mode powerline communication device,
receiving and processing the payload associated with the second packet at the dual mode powerline communication device.

9. The method of claim 8, wherein the transmission duration associated with the second packet comprises one or more of a length associated with the second packet, a time interval for which the second packet will be transmitted, and a number of clock cycles for which the second packet will be transmitted.

10. The method of claim 1, further comprising:
receiving a second packet at the dual mode powerline communication device;

determining, at the dual mode powerline communication device, that the second packet is not intended for the dual mode powerline communication device;

determining, at the dual mode powerline communication device, that the second packet does not comprise an indication of a transmission duration associated with the second packet; and suspending transmissions of the dual mode powerline communication device for a predetermined time interval, in response to determining that the second packet does not comprise the indication of the transmission duration associated with the second packet.

11. The method of claim 1, wherein said transmitting the packet via the powerline communication network further comprises:

determining, at the dual mode powerline communication device, a priority associated with the packet;

transmitting, via the powerline communication network, an indication of the priority associated with the packet during predetermined priority resolution time intervals;

determining, at the dual mode powerline communication device, whether to contend for control of the powerline medium associated with the powerline communication network to transmit the packet based, at least in part, on the priority associated with the packet.

12. The method of claim 11, wherein said determining whether to contend for control of the powerline medium comprises:
    determining, at the dual mode powerline communication device, whether another powerline communication device of the powerline communication network comprises a packet to be transmitted associated with a priority that is greater than the priority associated with the packet of the dual mode powerline communication device.

13. The method of claim 1, wherein in response to determining that the powerline communication network comprises the combination of powerline device classes, the method further comprises:
    determining a communication time interval allocated only for communications of the second class of powerline communication devices and a hybrid communication time interval allocated for communications of the first class of powerline communication devices and the communications of the second class of powerline communication devices; and
    transmitting, to the powerline communication device of the first class of powerline communication devices and the powerline communication device of the second class of powerline communication devices, an indication of the communication time interval allocated only for the communications of the second class of powerline communication devices and the hybrid communication time interval.

14. The method of claim 13, wherein said determining the communication time interval allocated only for the communications of the second class of powerline communication devices and the hybrid communication time interval is based on one or more of a number of powerline communication devices of the first class of powerline communication devices in the powerline communication network, a number of powerline communication devices of the second class of powerline communication devices in the powerline communication network, a traffic load associated with the first class of powerline communication devices, a traffic load associated with the second class of powerline communication devices, priority associated with the communications of the first class of powerline communication devices, priority associated with the communications of the second class of powerline communication devices, bandwidth requirements associated with the first class of powerline communication devices, and bandwidth requirements associated with the second class of powerline communication devices.

15. A communication network device comprising:
    a processor;
    a network interface coupled with the processor; and
    a dual mode communication unit coupled with the processor and the network interface, the dual mode communication unit operable to:
        determine whether a powerline communication network comprises a combination of powerline device classes including a powerline communication device devices of a first class of powerline communication devices and a powerline communication device of a second class of powerline communication devices; and
        in response to the dual mode communication unit determining that the powerline communication network comprises the combination of powerline device classes, perform operations comprising:
            select a packet header that is compatible with the first class of powerline communication devices and the second class of powerline communication devices, wherein the selected packet header includes a first portion including a first header compatible with the first class of powerline communication devices and a second portion including a second header compatible with the second class of powerline communication devices,
            generate a packet for transmission based, at least in part, on the selected packet header, and
            execute contention resolution procedures in response to determining to contend for control of a powerline medium,
            determine whether the contention resolution procedures are successful,
            transmit the packet via the powerline communication network in response to determining that the contention resolution procedures are successful, and
            determine to not transmit the packet via the powerline communication network in response to determining that the contention resolution procedures are not successful.

16. The communication network device of claim 15, wherein the dual mode communication unit is further operable to:
    determine that the powerline communication network comprises the powerline communication device of the second class of powerline communication devices, in response to the dual mode communication unit determining that the powerline communication network does not comprises the combination of powerline device classes; and
    in response to the dual mode communication unit determining that the powerline communication network comprises the powerline communication device of the second class of powerline communication devices, perform operations comprising:
        select a packet header that is compatible with the second class of powerline communication devices, and
        generate a second packet for transmission based, at least in part, on the selected packet header that is compatible with the second class of powerline communication devices.

17. The communication network device of claim 15, wherein the first class of powerline communication devices comprises one or more of a HomePlug 1.0 device and a HomePlug AV device, and wherein the second class of powerline communication devices comprises a G.HN device.

18. The communication network device of claim 15, wherein the dual mode communication unit is operable to select the packet header based on at least one of a version associated with the first class of powerline communication devices, whether the powerline communication device of the first class of powerline communication devices is enabled, and whether the powerline communication device of the second class of powerline communication devices is enabled.

19. The communication network device of claim 15, wherein the dual mode communication unit is further operable to:
    receive a second packet via the powerline communication network;
    determine whether the second packet was received from powerline communication device of the first class of powerline communication devices or from the powerline communication device of the second class of powerline communication devices;

process the second packet in accordance with processing operations associated with the first class of powerline communication devices, in response to the dual mode communication unit determining that the second packet was received from powerline communication device of the first class of powerline communication devices; and process the second packet in accordance with processing operations associated with the second class of powerline communication devices, in response to the dual mode communication unit determining that the second packet was received from the powerline communication device of the second class of powerline communication devices.

20. The communication network device of claim 15, wherein the dual mode communication unit is further operable to:

determine that the powerline communication device of the first class of powerline communication devices is disabled; and configure the communication network device to operate in accordance with communication standards associated with the second class of powerline communication devices in response to the dual mode communication unit determining that the powerline communication device of the first class of powerline communication devices is disabled.

21. The communication network device of claim 15, wherein the dual mode communication unit is further operable to:

receive a second packet via the powerline communication network;

determine a transmission duration associated with the second packet based, at least in part, on a header associated with the second packet;

determine whether the second packet is intended for the communication network device;

in response to the dual mode communication unit determining that the second packet is not intended for the communication network device,
  determine not to receive and process a payload associated with the second packet;
  suspend transmissions of the communication network device for at least the transmission duration associated with the second packet; and in response to the dual mode communication unit determining that the second packet is intended for the communication network device,
  receive and process the payload associated with the second packet.

22. The communication network device of claim 15, wherein the dual mode communication unit operable to transmit the packet via the powerline communication network further comprises the dual mode communication unit operable to:

determine a priority associated with the packet;

transmit, via the powerline communication network, an indication of the priority associated with the packet during predetermined priority resolution time intervals;

determine whether to contend for control of a powerline medium associated with the powerline communication network to transmit the packet based, at least in part, on the priority associated with the packet.

23. One or more machine-readable storage media having instructions stored therein, which when executed by one or more processor units causes the one or more processor units to perform operations that comprise:

determining, at a dual mode powerline communication device, whether a powerline communication network comprises a combination of powerline device classes including a powerline communication device of a first class of powerline communication devices and a powerline communication device of a second class of powerline communication devices; and in response to determining that the powerline communication network comprises the combination of powerline device classes, comprising:
  selecting a packet header that is compatible with the first class of powerline communication devices and the second class of powerline communication devices, wherein the selected packet header includes a first portion including a first header compatible with the first class of powerline communication devices and a second portion including a second header compatible with the second class of powerline communication devices,
  generating a packet for transmission based, at least in part, on the selected packet header,
  executing, at the dual mode powerline communication device, contention resolution procedures in response to determining to contend for control of a powerline medium,
  determining, at the dual mode powerline communication device, whether the contention resolution procedures are successful,
  transmitting the packet via the powerline communication network in response to determining that the contention resolution procedures are successful, and
  determining, at the dual mode powerline communication device, to not transmit the packet via the powerline communication network in response to determining that the contention resolution procedures are not successful.

24. The machine-readable storage media of claim 23, wherein the operations further comprise:

determining that the powerline communication network comprises the powerline communication device of the second class of powerline communication devices, in response to determining that the powerline communication network does not comprises the combination of powerline device classes; and in response to said operation of determining that the powerline communication network comprises the powerline communication device of the second class of powerline communication devices, performing operations comprising:
  selecting a packet header that is compatible with the second class of powerline communication devices, and
  generating a second packet for transmission based, at least in part, on the selected packet header that is compatible with the second class of powerline communication devices.

25. The machine-readable storage media of claim 23, wherein said operation of transmitting the packet via the powerline communication network further comprises:

determining a priority associated with the packet;

transmitting an indication of the priority associated with the packet during predetermined priority resolution time intervals;

determining whether to contend for control of a powerline medium associated with the powerline communication network to transmit the packet based, at least in part, on the priority associated with the packet.

* * * * *